US012795001B2

(12) United States Patent
Basu Mallick et al.

(10) Patent No.: US 12,795,001 B2
(45) **Date of Patent: *Nov. 10, 2026**

(54) CONTROL SIGNALING INDICATING LINKED BANDWIDTH PARTS

(71) Applicant: Lenovo (Singapore) Pte. Ltd., New Tech Park (SG)

(72) Inventors: Prateek Basu Mallick, Dreieich (DE); Joachim Loehr, Wiesbaden (DE); Alexander Johann Maria Golitschek Edler von Elbwart, Darmstadt (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,892

(22) Filed: May 8, 2023

(65) Prior Publication Data

US 2023/0275980 A1 Aug. 31, 2023

Related U.S. Application Data

(63) Continuation of application No. 17/496,410, filed on Oct. 7, 2021, now Pat. No. 11,695,859, which is a (Continued)

(51) Int. Cl.

*H04L 69/22* (2022.01)
*H04L 5/00* (2006.01)

(Continued)

(52) U.S. Cl.

CPC ............ *H04L 69/22* (2013.01); *H04L 5/0098* (2013.01); *H04W 28/06* (2013.01); *H04W 28/20* (2013.01);

(Continued)

(58) Field of Classification Search

CPC ............................... H04L 69/22; H04W 28/20

See application file for complete search history.

(56) References Cited

U.S. PATENT DOCUMENTS

| | | | |
|---|---|---|---|
| 2018/0270698 | A1 | 9/2018 | Babaei et al. |
| 2019/0036673 | A1 | 1/2019 | Chen et al. |

(Continued)

FOREIGN PATENT DOCUMENTS

| | | | |
|---|---|---|---|
| EP | 3253157 | A1 | 12/2017 |
| EP | 3506713 | A1 | 7/2019 |
| EP | 3648386 | A1 | 6/2020 |

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V2.0.0, Dec. 2017, pp. 1-55.

(Continued)

*Primary Examiner* — Sulaiman Nooristany

(74) *Attorney, Agent, or Firm* — Kunzler Needham Hilton

(57) ABSTRACT

Apparatuses, methods, and systems are disclosed for determining linked bandwidth parts. One method includes determining that a plurality of bandwidth parts is activated. The method includes determining that a scheduling resource is configured on the plurality of bandwidth parts, semi-persistent scheduling is configured on the plurality of bandwidth parts, or a combination thereof. The method includes determining a bandwidth part of the plurality of bandwidth parts to use for an uplink transmission.

18 Claims, 13 Drawing Sheets

Related U.S. Application Data continuation of application No. 16/276,574, filed on Feb. 14, 2019, now Pat. No. 11,159,653.

(60) Provisional application No. 62/630,770, filed on Feb. 14, 2018.

(51) Int. Cl.

| | |
|---|---|
| ***H04W 28/06*** | (2009.01) |
| ***H04W 28/20*** | (2009.01) |
| ***H04W 72/0453*** | (2023.01) |
| ***H04W 74/00*** | (2009.01) |
| *H04W 74/0833* | (2024.01) |

(52) U.S. Cl.

CPC ..... *H04W 72/0453* (2013.01); *H04W 74/002* (2013.01); *H04L 5/001* (2013.01); *H04W 74/0833* (2013.01)

(56) References Cited

U.S. PATENT DOCUMENTS

| | | | | |
|---|---|---|---|---|
| 2019/0045491 | A1* | 2/2019 | Zhang | H04L 5/001 |
| 2019/0132857 | A1 | 5/2019 | Babaei et al. | |
| 2019/0141742 | A1* | 5/2019 | Zhou | H04L 5/0064 |
| 2019/0149305 | A1 | 5/2019 | Zhou et al. | |
| 2019/0149380 | A1 | 5/2019 | Babaei et al. | |
| 2019/0150123 | A1* | 5/2019 | Nogami | H04L 5/0053 370/330 |
| 2019/0150172 | A1 | 5/2019 | Ang et al. | |
| 2019/0208436 | A1* | 7/2019 | Zhou | H04B 17/309 |
| 2019/0208548 | A1* | 7/2019 | Shih | H04L 5/0051 |
| 2019/0215126 | A1 | 7/2019 | Choi et al. | |
| 2019/0215871 | A1 | 7/2019 | Aiba et al. | |
| 2019/0223227 | A1* | 7/2019 | Jiang | H04L 5/0092 |
| 2019/0393992 | A1 | 12/2019 | Xiong et al. | |
| 2020/0045702 | A1* | 2/2020 | Chen | H04W 72/0453 |
| 2020/0221428 | A1 | 7/2020 | Moon et al. | |
| 2020/0351851 | A1 | 11/2020 | Aiba et al. | |
| 2020/0389922 | A1* | 12/2020 | Xu | H04L 5/0053 |

OTHER PUBLICATIONS

ETSI, "5G; Study on Scenarios and Requirements for Next Generation Access Technologies (3GPP TR 38.913 version 14.2.0 Release 14)", ETSI TR 138 913 V14.2.0, Technical Report, May 2107, pp. 1-40.

Huawei, Hisilicon, "Remaining issues on bandwidth part and wideband operation", 3GPP TSG RAN WG1 NR Ad Hoc Meeting, R1-1800018, Jan. 22-26, 2018, pp. 1-14.

CATT, "SR configuration, mapping and transmission for CA and BWPs cases", 3GPP TSG-RAN WG2 #99bis, R2-1710296, Oct. 9-13, 2017, pp. 1-4.

ETRI, "Views on bandwidth part in idle mode operation", 3GPP TSG RAN WG1 Meeting #90 R1-1713820, Aug. 21-25, 2017, pp. 1-6.

Spreadtrum Communications, "Remaining issues on UL/DL BWP configuration", 3GPP TSG-RAN WG1#91 R1-1719698, Nov. 27-Dec. 1, 2017, pp. 1-3.

VIVO, "Other aspects on bandwidth part operation", 3GPP TSG RAN WG1 Meeting AH 1801 R1-1800206, Jan. 22-26, 2018, pp. 1-5.

Mediatek Inc., "Text Proposal for BWP Operation in 38.300", 3GPP TSG-RAN WG2 #99-bis R2-1710866, Oct. 9-13, 2017, pp. 1-2.

CATT, "Further details of BWP operation", 3GPP TSG RAN WG1 Meeting #91 R1-1720208, Nov. 27-Dec. 1, 2017, pp. 1-4.

Institute for Information Industry (III), "The impact of BWP configuration and switching", 3GPP TSG-RAN WG2 NR Ad hoc 1801 R2-1800778, Jan. 22-26, 2018, pp. 1-5.

3GPP, 3rd Generation Partnership Project; Technical Specification Group Radio Access Network; NR; Physical layer procedures for data (Release 15), 3GPP TS 38.214 V15.0.0, Dec. 2017, pp. 1-71.

ZTE, "sPUCCH format design", 3GPP TSG RAN WG1 Meeting #90 R1-1712326, Aug. 21-25, 2017, pp. 1-9.

Intel Corporation, "Proposed changes for BWP related specification descriptions", 3GPP TSG RAN WG1 Meeting AH 1801 R1-1800337, Jan. 22-26, 2018, pp. 1-7.

* cited by examiner

CONTROL SIGNALING INDICATING LINKED BANDWIDTH PARTS

CROSS-REFERENCE TO RELATED APPLICATIONS

This application is a continuation application of U.S. patent application Ser. No. 17/496,410, filed on Oct. 7, 2021, which is a continuation application of U.S. patent application Ser. No. 16/276,574, filed on Feb. 14, 2019, which claims priority to U.S. Patent Application Ser. No. 62/630,770 entitled "EFFICIENTLY LINKING MULTIPLE UL AND DL BANDWIDTH PORTIONS" and filed on Feb. 14, 2018 for Prateek Basu Mallick, all of which are incorporated herein by reference in their entirety.

FIELD

The subject matter disclosed herein relates generally to wireless communications and more particularly relates to determining linked bandwidth parts.

BACKGROUND

The following abbreviations are herewith defined, at least some of which are referred to within the following description: Third Generation Partnership Project ("3GPP"), 5th Generation ("5G"), Positive-Acknowledgment ("ACK"), Aggregation Level ("AL"), Access and Mobility Management Function ("AMF"), Access Point ("AP"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), Primary Cell ("PCell"), Policy Control Function ("PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACK"), Random Access Response ("RAR"), Radio Link Control ("RLC"), Radio Network Temporary Identifier ("RNTI"), Reference Signal ("RS"), Remaining Minimum System Information ("RMSI"), Radio Resource Control ("RRC"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), Subscriber Identity/Identification Module ("SIM"), Signal-to-Interference-Plus-Noise Ratio ("SINR"), Service Level Agreement ("SLA"), Session Management Function ("SMF"), Single Network Slice Selection Assistance Information ("S-NSSAI"), Shortened TTI ("sTTI"), Synchronization Signal ("SS"), Synchronization Signal Block ("SSB"), Supplementary Uplink ("SUL"), Subscriber Permanent Identifier ("SUPI"), Tracking Area ("TA"), TA Indicator ("TAI"), Transport Block ("TB"), Transport Block Size ("TB S"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/

Equipment (Mobile Terminal) ("UE"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), Visiting AMF ("vAMF"), Visiting NSSF ("vNSSF"), Visiting PLMN ("VPLMN"), and Worldwide Interoperability for Microwave Access ("WiMAX").

In certain wireless communications networks, bandwidth parts may be used. In such networks, a device may not know what bandwidth parts to use for UL and/or DL.

BRIEF SUMMARY

Methods for determining linked bandwidth parts are disclosed. Apparatuses and systems also perform the functions of the apparatus. One embodiment of a method includes determining an identification of a bandwidth part. In certain embodiments, the method includes determining an uplink bandwidth part and a downlink bandwidth part based on the identification of the bandwidth part. In various embodiments, the method includes using the uplink bandwidth part and the downlink bandwidth part in response to determining the uplink bandwidth part and the downlink bandwidth part.

One apparatus for determining linked bandwidth parts includes a processor that: determines an identification of a bandwidth part; determines an uplink bandwidth part and a downlink bandwidth part based on the identification of the bandwidth part; and uses the uplink bandwidth part and the downlink bandwidth part in response to determining the uplink bandwidth part and the downlink bandwidth part.

One method for determining linked bandwidth parts includes determining that a plurality of uplink bandwidth parts is configured. In certain embodiments, the method includes determining that a plurality of downlink bandwidth parts is configured. In various embodiments, the method includes receiving first information indicating a linking between the plurality of uplink bandwidth parts and the plurality of downlink bandwidth parts.

One apparatus for determining linked bandwidth parts includes a processor that: determines that a plurality of uplink bandwidth parts is configured; and determines that a plurality of downlink bandwidth parts is configured. In some embodiments, the apparatus includes a receiver that receives first information indicating a linking between the plurality of uplink bandwidth parts and the plurality of downlink bandwidth parts.

One method for determining linked bandwidth parts includes determining that a plurality of bandwidth parts is activated. In certain embodiments, the method includes determining that a scheduling resource is configured on the plurality of bandwidth parts, semi-persistent scheduling is configured on the plurality of bandwidth parts, or a combination thereof. In various embodiments, the method includes determining a bandwidth part of the plurality of bandwidth parts to use for an uplink transmission.

One apparatus for determining linked bandwidth parts includes a processor that: determines that a plurality of bandwidth parts is activated; determines that a scheduling resource is configured on the plurality of bandwidth parts, semi-persistent scheduling is configured on the plurality of bandwidth parts, or a combination thereof; and determines a bandwidth part of the plurality of bandwidth parts to use for an uplink transmission.

One method for determining linked bandwidth parts includes determining that a plurality of downlink bandwidth parts is configured. In certain embodiments, the method includes receiving information indicating a downlink bandwidth part of the plurality of downlink bandwidth parts. In various embodiments, the method includes determining a spatial domain transmission filter using the downlink bandwidth part.

One apparatus for determining linked bandwidth parts includes a processor that determines that a plurality of downlink bandwidth parts is configured. In some embodiments, the apparatus includes a receiver that receives information indicating a downlink bandwidth part of the plurality of downlink bandwidth parts. In certain embodiments, the processor determines a spatial domain transmission filter using the downlink bandwidth part.

One method for determining linked bandwidth parts includes determining that a plurality of bandwidth parts is configured. In certain embodiments, the method includes determining that the plurality of bandwidth parts has configured random access channel resources. In various embodiments, the method includes transmitting a first random access message on an uplink bandwidth part of the plurality of bandwidth parts. In some embodiments, the method includes receiving a second random access message on a downlink bandwidth part of the plurality of bandwidth parts.

One apparatus for determining linked bandwidth parts includes a processor that: determines that a plurality of bandwidth parts is configured; and determines that the plurality of bandwidth parts has configured random access channel resources. In some embodiments, the apparatus includes a transmitter that transmits a first random access message on an uplink bandwidth part of the plurality of bandwidth parts. In certain embodiments, the apparatus includes a receiver that receives a second random access message on a downlink bandwidth part of the plurality of bandwidth parts.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
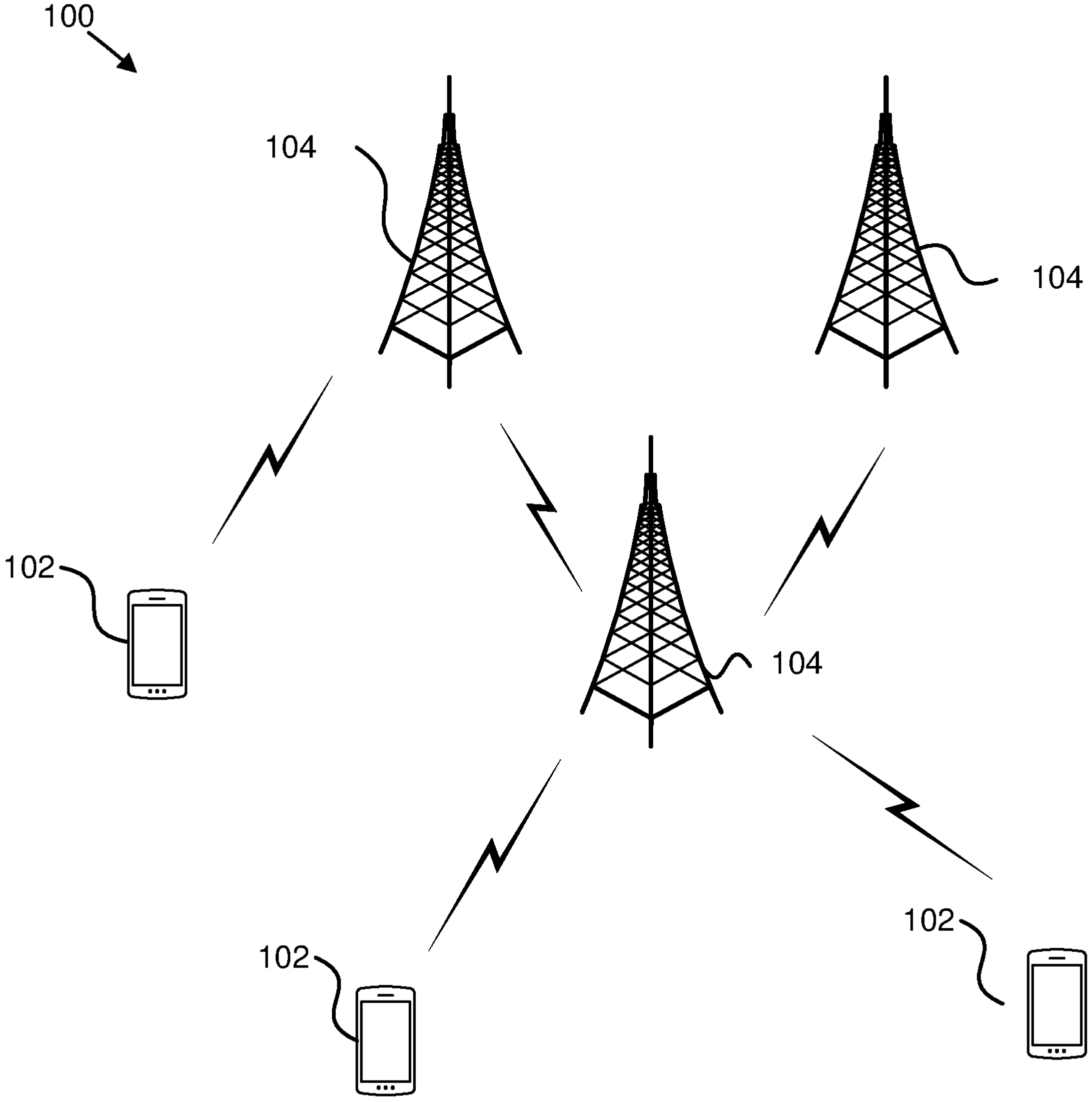
FIG. 1 is a schematic block diagram illustrating one embodiment of a wireless communication system for determining linked bandwidth parts.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining linked bandwidth parts. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may determine an identification of a bandwidth part. In certain embodiments, the remote unit 102 may determine an uplink bandwidth part and a downlink bandwidth part based on the identification of the bandwidth part. In various embodiments, the remote unit 102 may use the uplink bandwidth part and the downlink bandwidth part in response to determining the uplink bandwidth part and the downlink bandwidth part. Accordingly, the remote unit 102 may be used for determining linked bandwidth parts.

In certain embodiments, a remote unit 102 may determine that a plurality of uplink bandwidth parts is configured. In certain embodiments, the remote unit 102 may determine that a plurality of downlink bandwidth parts is configured. In various embodiments, the remote unit 102 may receive first information indicating a linking between the plurality of uplink bandwidth parts and the plurality of downlink bandwidth parts. Accordingly, the remote unit 102 may be used for determining linked bandwidth parts.

In certain embodiments, a remote unit 102 may determine that a plurality of bandwidth parts is activated. In certain embodiments, the remote unit 102 may determine that a scheduling resource is configured on the plurality of bandwidth parts, semi-persistent scheduling is configured on the plurality of bandwidth parts, or a combination thereof. In various embodiments, the remote unit 102 may determine a bandwidth part of the plurality of bandwidth parts to use for an uplink transmission. Accordingly, the remote unit 102 may be used for determining linked bandwidth parts.

In certain embodiments, a remote unit 102 may determine that a plurality of downlink bandwidth parts is configured. In certain embodiments, the remote unit 102 may receive information indicating a downlink bandwidth part of the plurality of downlink bandwidth parts. In various embodiments, the remote unit 102 may determine a spatial domain transmission filter using the downlink bandwidth part. Accordingly, the remote unit 102 may be used for determining linked bandwidth parts.

In certain embodiments, a remote unit 102 may determine that a plurality of bandwidth parts is configured. In certain embodiments, the remote unit 102 may determine that the plurality of bandwidth parts has configured random access channel resources. In various embodiments, the remote unit 102 may transmit a first random access message on an uplink bandwidth part of the plurality of bandwidth parts. In some embodiments, the remote unit 102 may receive a second random access message on a downlink bandwidth part of the plurality of bandwidth parts. Accordingly, the remote unit 102 may be used for determining linked bandwidth parts.

Figure 2:
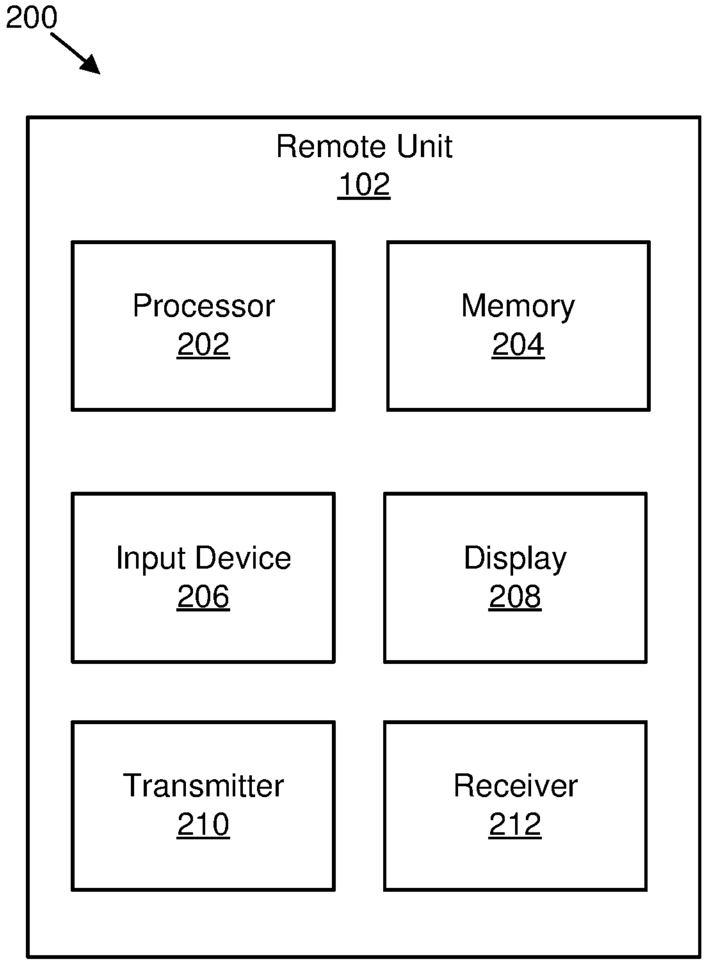
FIG. 2 is a schematic block diagram illustrating one embodiment of an apparatus that may be used for determining linked bandwidth parts.

FIG. 2 depicts one embodiment of an apparatus 200 that may be used for determining linked bandwidth parts. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: determine an identification of a bandwidth part; determine an uplink bandwidth part and a downlink bandwidth part based on the identification of the bandwidth part; and use the uplink bandwidth part and the downlink bandwidth part in response to determining the uplink bandwidth part and the downlink bandwidth part. In some embodiments, the processor 202 may: determine that a plurality of uplink bandwidth parts is configured; and determine that a plurality of downlink bandwidth parts is configured. In certain embodiments, the processor 202 may: determine that a plurality of bandwidth parts is activated; determine that a scheduling resource is configured on the plurality of bandwidth parts, semi-persistent scheduling is configured on the plurality of bandwidth parts, or a combination thereof; and determine a bandwidth part of the plurality of bandwidth parts to use for an uplink transmission. In various embodiments, the processor 202 may: determine that a plurality of downlink bandwidth parts is configured; and determine a spatial domain transmission filter using a downlink bandwidth part. In some embodiments, the processor 202 may: determine that a plurality of bandwidth parts is configured; and determine that the plurality of bandwidth parts has configured random access channel resources. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 receives first information indicating a linking between a plurality of uplink bandwidth parts and a plurality of downlink bandwidth parts. In certain embodiments, the receiver 212 receives information indicating a downlink bandwidth part of a plurality of downlink bandwidth parts. In various embodiments, the transmitter 210 transmits a first random access message on an uplink bandwidth part of a plurality of bandwidth parts. In some embodiments, the receiver 212 receives a second random access message on a downlink bandwidth part of a plurality of bandwidth parts.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
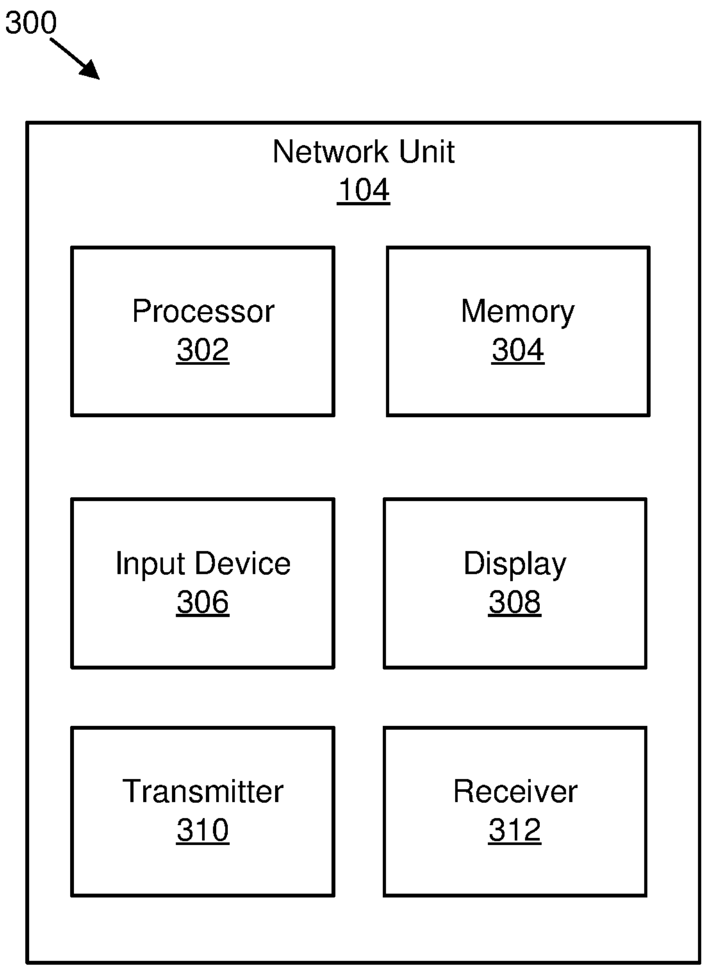
FIG. 3 is a schematic block diagram illustrating one embodiment of an apparatus that may be used for determining linked bandwidth parts.

FIG. 3 depicts one embodiment of an apparatus 300 that may be used for determining linked bandwidth parts. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various configurations, there may be different requirements for different services (e.g., eMBB, URLLC, mMTC). Some configurations may support different OFDM numerologies (e.g., SCS, CP length) in a single framework. In certain embodiments, different configurations may have diverse requirements corresponding to data rates, latency, and/or coverage. For example, eMBB may be expected to support peak data rates (e.g., 20 Gbps for DL and/or 10 Gbps for UL) and user-experienced data rates up to three times what is offered by IMT-Advanced. As another example, URLLC may have tighter requirements on ultra-low latency (e.g., 0.5 ms for UL and DL each for user plane latency) and high reliability (e.g., 1-10-5 within 1 ms) than other configurations. As a further example, mMTC may require high connection density, large coverage in harsh environments, and/or extremely long-life battery for low cost devices. Therefore, an OFDM numerology (e.g., subcarrier spacing, OFDM symbol duration, CP duration, number of symbols per scheduling interval) that is suitable for one configuration might not work well for another. For example, low-latency services may use a shorter symbol duration (and thus larger subcarrier spacing) and/or fewer symbols per scheduling interval (e.g., TTI) than an mMTC service. Furthermore, deployment scenarios with large channel delay spreads may have a longer CP duration than scenarios with short delay spreads. In some embodiments, subcarrier spacing may be optimized to result in a desired CP overhead.

In some embodiments, to enable bandwidth adaption (e.g., adapting a size of bandwidth used for data transmission in a serving cell) on a PCell, a gNB (e.g., network unit 104) may configure a UE (e.g., remote unit 102) with UL and DL BWPs. In various embodiments, to enable bandwidth adaptation on SCells for carrier aggregation, a gNB may configure a UE at least with DL BWPs (e.g., there may be no BWPs in UL).

In certain embodiments, such as in a paired spectrum, DL and UL may switch BWPs independently. In some embodiments, such as in an unpaired spectrum, DL and UL may switch BWPs simultaneously. In various embodiments, switching between configured BWPs occurs as a result of DCI (e.g., PDCCH indicating to switch to another BWP), or an inactivity timer. In certain embodiments, if an inactivity timer is configured for a serving cell, the expiry of the inactivity timer associated to that cell may switch an active BWP to a default BWP configured by a network.

In some embodiments, a serving cell may be configured with at most four BWPs, and for an activated serving cell, there may always be one active BWP at any point in time. In such embodiments, BWP switching for a serving cell may be used to activate an inactive BWP and deactivate an active BWP at the same time (e.g., concurrently), and may be controlled by PDCCH indicating a downlink assignment or an uplink grant. In various embodiments, upon addition or activation of an SCell, one BWP may be initially active (e.g., default BWP) without receiving PDCCH indicating a downlink assignment or an uplink grant.

In certain embodiments, on an active BWP for each activated serving cell configured with a BWP, a MAC entity may have various operations including: transmit on UL-SCH; transmit on RACH; monitor a PDCCH; transmit PUCCH; receive DL-SCH; and/or initialize (or re-initialize) any suspended configured uplink grants of configured grant Type 1 according to a stored configuration.

In some embodiments, on an inactive BWP for each activated serving cell configured with a BWP, a MAC entity may: not transmit on UL-SCH; not transmit on RACH; not monitor a PDCCH; not transmit PUCCH; not receive DL-SCH; clear any configured downlink assignment and/or configured uplink grant of configured grant Type 2; and/or suspend any configured uplink grant of configured Type 1.

In various embodiments, if an active UL BWP has no PRACH resources configured, a UE may, upon triggering of a RACH procedure, switch to an initial DL BWP and UL BWP and perform the RACH procedure. In some embodiments, if a MAC entity receives a PDCCH for BWP switching while a RACH procedure is ongoing in the MAC entity, UE implementation may determine whether to switch the BWP or ignore the PDCCH for BWP switching. In such embodiments, if the MAC entity decides to perform BWP switching, the MAC entity may stop the ongoing RACH procedure and initiate a RACH procedure on a newly activated BWP. Moreover, in such embodiments, if the MAC decides to ignore the PDCCH for BWP switching, the MAC entity may continue the ongoing RACH procedure on an already active BWP.

In certain embodiments, only one active BWP is enabled at a time. In such embodiments, each BWP may have an associated numerology (e.g., each BWP supports only one numerology). Accordingly, for configurations in which a UE supports services requiring different numerologies, a gNB may need to switch between different configured BWPs. In some embodiments, to support QoS more efficiently, such as in configurations in which a UE has services and/or radio bearer running that use different numerologies, multiple BWPs may be activated simultaneously. Having multiple BWPs simultaneously may result in the following: 1) in configurations in which multiple BWPs are active in both directions (e.g., a UE has multiple UL BWPs and multiple DL BWPs for a serving cell) then it may be unclear how and if there needs to be a linking between the UL and DL BWPs. In absence of such a linking it may not be clear: resources on which HARQ feedback for PDSCH transmission on a certain DL BWP may be transmitted (e.g., assuming a PUCCH configuration on more than one active UL BWP); on which DL BWP a UE may receive a random access Response; which DL BWP is to be used as a DL pathloss reference for UL power control for PUSCH, PUCCH, RACH etc.; and/or which DL BWP is to be used for determining if a UE should use SUL (e.g., supplementary Uplink as defined in TS 38.321 v200) or non-SUL (e.g., normal UL) (e.g., to determine and/or verify if an RSRP of a downlink pathloss reference is less than sul-RSRP-Threshold, etc.); 2) in various configurations a MAC entity may be configured with zero, one, or more SR configurations. An SR configuration may include a set of PUCCH resources for SR across different BWPs and cells. For a logical channel, at most one PUCCH resource for SR may be configured per BWP. Accordingly, it may not be known which UL BWP is used if a SR (e.g., PUCCH) and configured grant (e.g., SPS) is configured on multiple active BWPs; and 3) if more than one DL BWP is used for the reception of SSB, PBCH, a periodic CSI-RS, and/or a semi-persistent CSI-RS, in may be unknown which DL BWP reception is to be used by a UE to determine a spatial domain transmission filter for SRS transmission.

As described herein, linking one or more DL BWP with one or more UL BWP may be useful for a number of purposes, such as: to activate and/or deactivate some UL and/or DL BWPs together (e.g., a network may activate or deactivate an UL BWP and a DL BWP together if these are tied to the same link); to indicate on which UL BWP a HARQ feedback for PDSCH transmission on a certain DL BWP may be transmitted assuming that there is a PUCCH configuration on more than one active UL BWP; to indicate on which DL BWP a UE may receive a RAR; to indicate which DL BWP is to be used as a DL Pathloss reference for UL power control for PUSCH, PUCCH, RACH etc.; and/or to indicate which DL BWP is to be used for determining if a UE should use SUL (e.g., supplementary Uplink as defined in TS 38.321 v200) or non-SUL (e.g., normal UL) (e.g., to determine and/or verify if an RSRP of a downlink pathloss reference is less than sul-RSRP-Threshold, etc.).

Described herein are at least three methods of linking: one-to-one linking; many-to-one linking; and linking based on a primary BWP. As may be appreciated, linking between DL and UL BWPs may be independent for different purposes as described herein.

Figure 4:
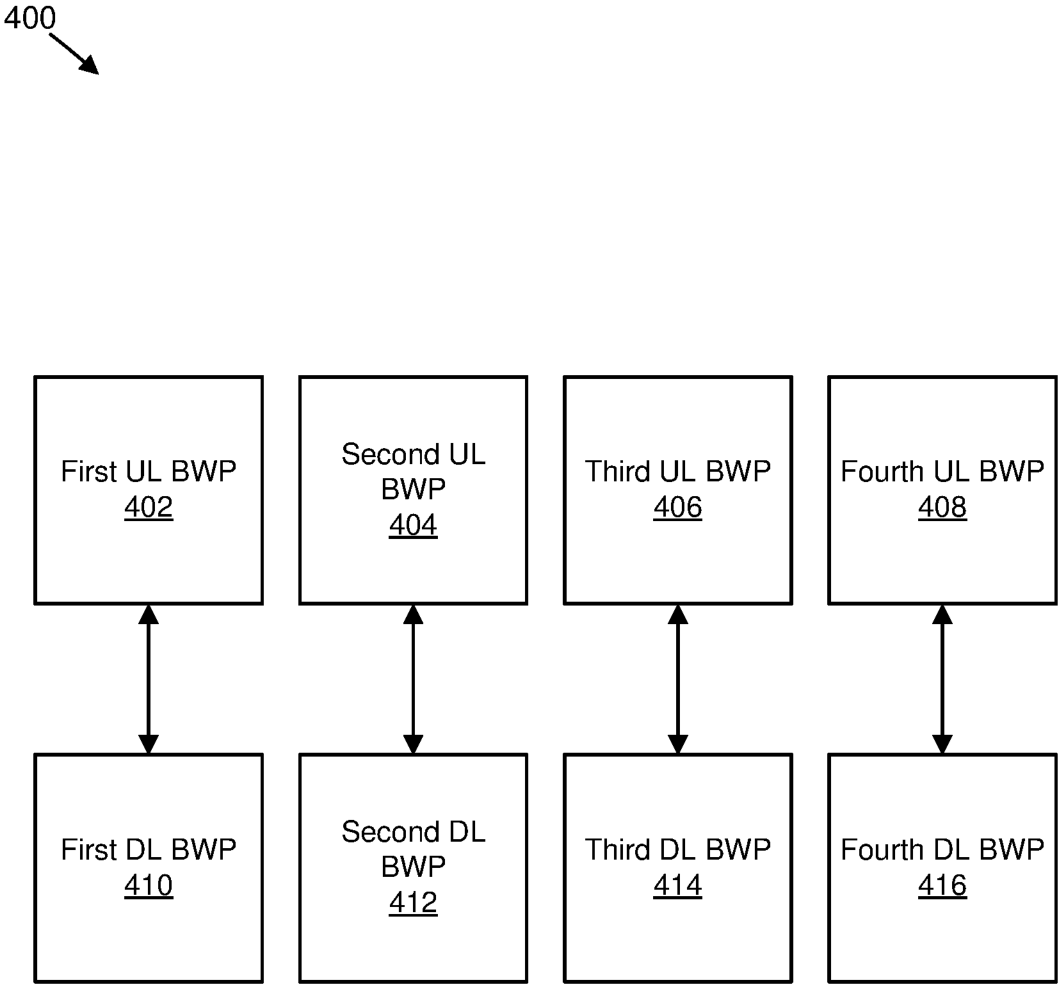
FIG. 4 is a schematic block diagram illustrating one embodiment of a system having one to one mapping of UL BWPs and DL BWPs.

FIG. 4 is a schematic block diagram illustrating one embodiment of a system 400 having one-to-one mapping of UL BWPs and DL BWPs. Specifically, the system 400 includes a first UL BWP 402, a second UL BWP 404, a third UL BWP 406, a fourth UL BWP 408, a first DL BWP 410, a second DL BWP 412, a third DL BWP 414, and a fourth DL BWP 416. As illustrated, the first UL BWP 402 is linked to the first DL BWP 410, the second UL BWP 404 is linked to the second DL BWP 412, the third UL BWP 406 is linked to the third DL BWP 414, and the fourth UL BWP 408 is linked to the fourth DL BWP 416.

In certain embodiments, the linking illustrated in FIG. 4 may be indicated by a gNB to a UE via RRC signaling at a time of BWP configuration. In some embodiments, a BWP reconfiguration may be used to change linking from one DL BWP to another DL BWP. In various embodiments, for BWP activation and/or deactivation, both UL and DL BWP that are linked may be activated, deactivated, or switched together (e.g., using the same RRC signaling, MAC signaling, or DCI signaling in which the signaling only indicates a DL BWP number, an UL BWP number, or a link index and then a UE acts (e.g., activates, deactivates, or switches) for the DL BWP and its linked UL BWP). In certain embodiments, an ID of a BWP refers to an DL-UL BWP pair directly, a DL BWP, or an UL BWP. In one example, link ID A=DL BWP (e.g., with ID X)+UL BWP (e.g., with ID Y). So, it is possible that one of A, X, or Y is used to designate the link ID A.

In some embodiments, a linking may be indicated using MAC signaling, DCI signaling, or RRC signaling transmitted from a gNB (e.g., a MAC CE may indicate an order in which UL BWPs are linked to configured DL BWPs such that the first UL BWP 402 ID indicated by the MAC is linked to the first DL BWP 410 (e.g., DL BWP-1), the second UL BWP 404 ID indicated by the MAC is linked to the second DL BWP 412 (e.g., DL BWP-2) and so forth). In such embodiments, if MAC signaling indicates the sequence as 4, 2, 3, 1 then the fourth UL BWP 408 is linked to the first DL BWP 410, the second UL BWP 404 is linked to the second DL BWP 412, the third UL BWP 406 is linked to the third DL BWP 414, and the first UL BWP 402 is linked to the fourth DL BWP 416.

In various embodiments, a size of a corresponding field in a linking RRC message, MAC CE, or DCI may be determined by a number of configured BWPs, or a maximum number of configured BWPs. As may be appreciated, a number of configured BWPs may be less than a maximum number of configured BWPs; therefore, a number of bits to indicate the number of configured BWPs may be less than a number of bits to indicate the maximum number of configured BWPs. In some embodiments, the size of the corresponding field being determined by the maximum number of configured BWPs may facilitate reducing a misunderstanding about a linkage if a linking message between a gNB and a UE is lost or received with errors.

As may be appreciated, a one-to-one linking may be used for activation, deactivation, or switching UL and DL BWPs together, or for any other purpose. Moreover, the linking between the DL and UL BWPs may be independent for each purpose. For example, there may be a first linking for activation, a second linking for deactivation, a third linking for switching, a fourth linking for another purpose, or a fifth linking for all purposes.

Figure 5:
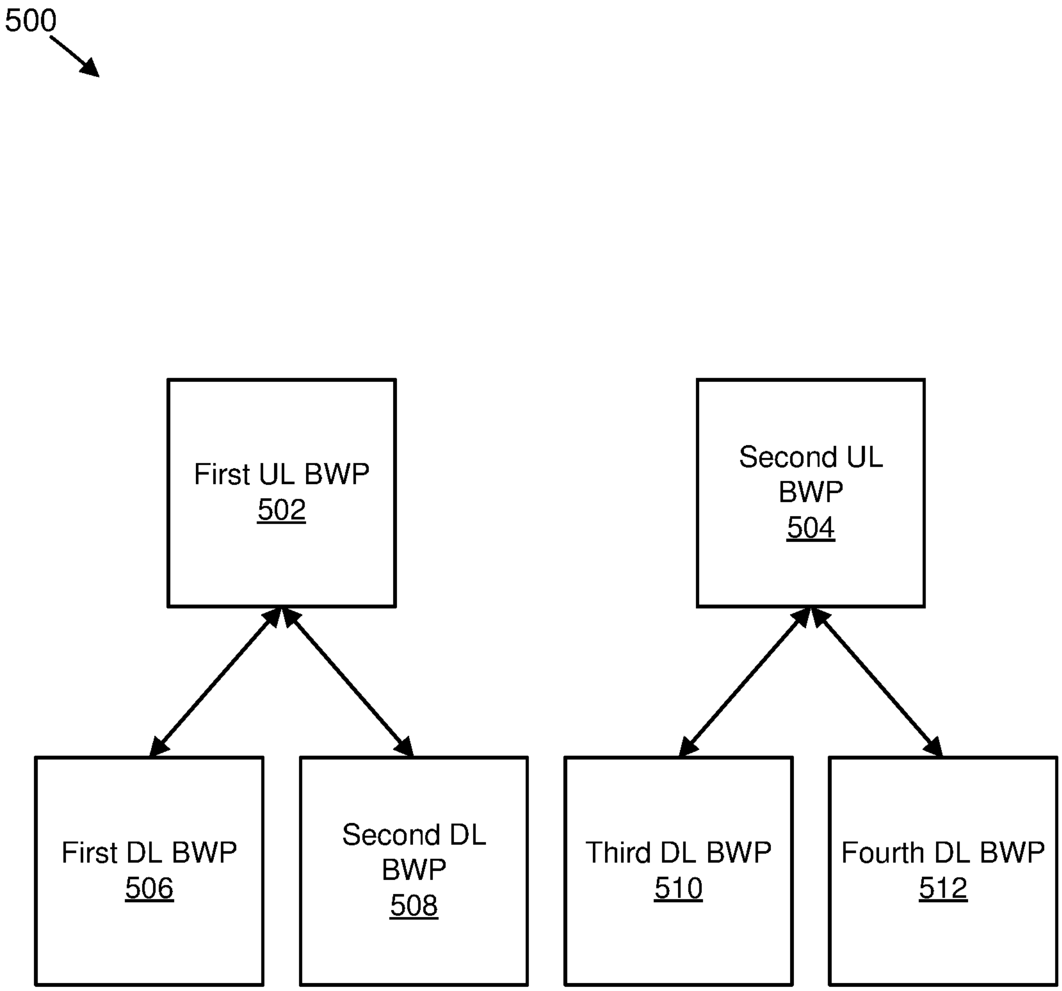
FIG. 5 is a schematic block diagram illustrating one embodiment of a system having many to one mapping of UL BWPs and DL BWPs.

FIG. 5 is a schematic block diagram illustrating one embodiment of a system 500 having many-to-one mapping of UL BWPs and DL BWPs. Specifically, the system 500 includes a first UL BWP 502, a second UL BWP 504, a first DL BWP 506, a second DL BWP 508, a third DL BWP 510, and a fourth DL BWP 512. As illustrated, the first UL BWP 502 is linked to the first DL BWP 506 and the second DL BWP 508, and the second UL BWP 504 is linked to the third DL BWP 510 and the fourth DL BWP 512.

In certain embodiments, the linking illustrated in FIG. 5 may be indicated by a gNB to a UE via RRC signaling at a time of BWP configuration. In some embodiments, a BWP reconfiguration may be used to change linking from one DL BWP to another DL BWP. In various embodiments, for BWP activation and/or deactivation, UL and DL BWPs that are linked may be activated, deactivated, or switched together (e.g., using the same RRC signaling, MAC signaling, or DCI signaling in which the signaling only indicates a DL BWP number, an UL BWP number, or a link index and then a UE acts (e.g., activates, deactivates, or switches) for the UL BWP and its linked DL BWPs). As may be appreciated, while FIG. 5 illustrates a linking between many DL BWPs and one UL BWP, other embodiments may link many UL BWPs to one DL BWP.

In some embodiments, a linking may be indicated using MAC signaling, DCI signaling, or RRC signaling transmitted from a gNB (e.g., a MAC CE may indicate an order in which UL BWPs are linked to configured DL BWPs such that the first UL BWP ID indicated by the MAC is linked to the first DL BWP 506 (e.g., DL BWP-1), the second UL BWP ID indicated by the MAC is linked to the second DL BWP 508 (e.g., DL BWP-2), the third UL BWP ID indicated by the MAC is linked to the third DL BWP 510 (e.g., DL BWP-3), and the fourth UL BWP ID indicated by the MAC is linked to the fourth DL BWP 512 (e.g., DL BWP-4)). In such embodiments, if MAC signaling indicates the sequence as 2, 1, 2, 1 then the second UL BWP 504 is linked to the first DL BWP 506, the first UL BWP 502 is linked to the second DL BWP 508, the second UL BWP 504 is linked to the third DL BWP 510, and the first UL BWP 502 is linked to the fourth DL BWP 512.

In various embodiments, a size of a corresponding field in a linking RRC message, MAC CE, or DCI may be determined by a number of configured BWPs, or a maximum number of configured BWPs. As may be appreciated, a number of configured BWPs may be less than a maximum number of configured BWPs; therefore, a number of bits to indicate the number of configured BWPs may be less than a number of bits to indicate the maximum number of configured BWPs. In some embodiments, the size of the corresponding field being determined by the maximum number of configured BWPs may facilitate reducing a misunderstanding about a linkage if a linking message between a gNB and a UE is lost or received with errors.

Figure 6:
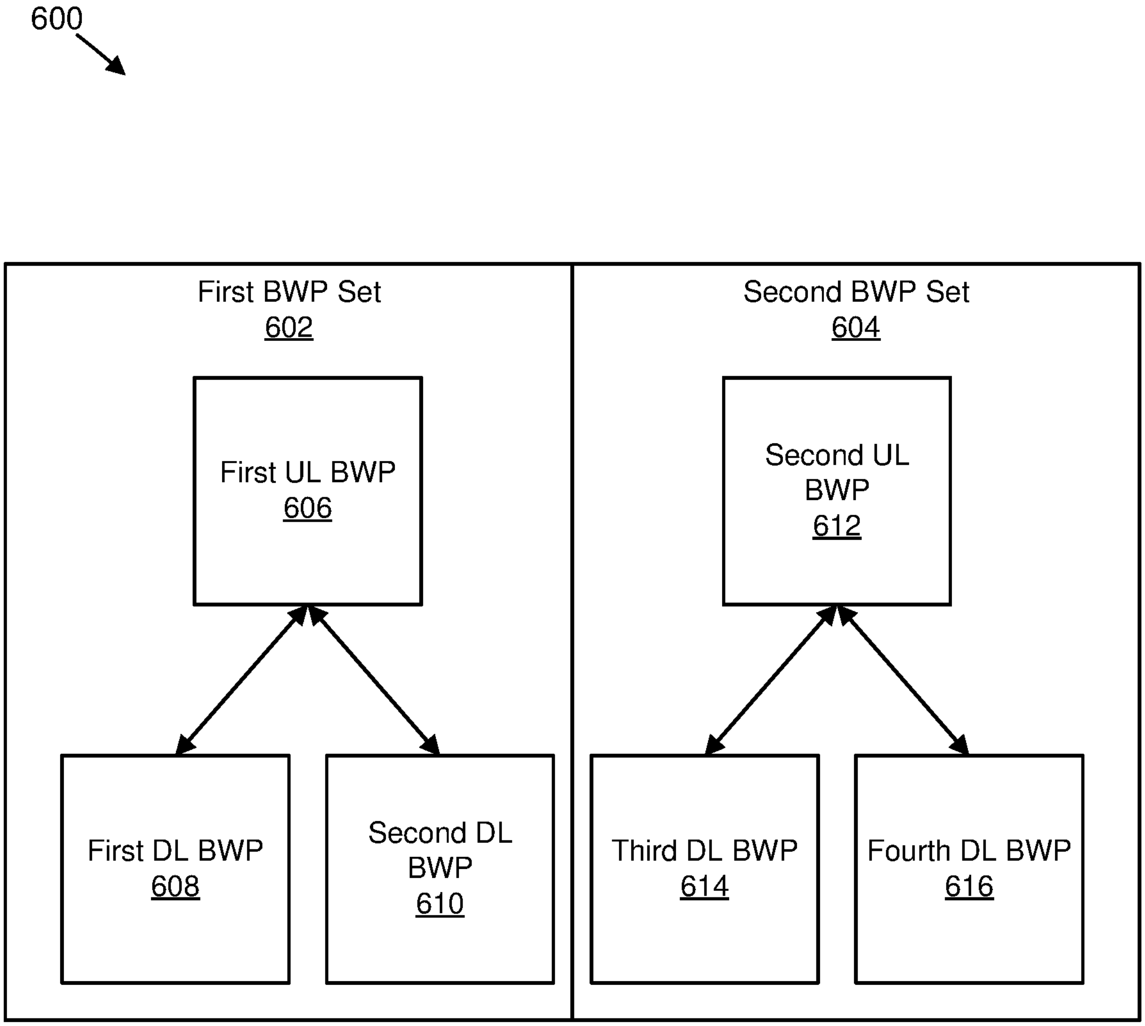
FIG. 6 is a schematic block diagram illustrating another embodiment of a system having many to one mapping of UL BWPs and DL BWPs.

FIG. 6 is a schematic block diagram illustrating another embodiment of a system 600 having many-to-one mapping of UL BWPs and DL BWPs. Specifically, the system 600 includes a first BWP set 602 and a second BWP set 604. The first BWP set 602 includes a first UL BWP 606, a first DL BWP 608, and a second DL BWP 610. Moreover, the second BWP set 604 includes a second UL BWP 612, a third DL BWP 614, and a fourth DL BWP 616. As illustrated, the first UL BWP 606 is linked to the first DL BWP 608 and the second DL BWP 610, and the second UL BWP 612 is linked to the third DL BWP 614 and the fourth DL BWP 616.

In some embodiments, a BWP set may be defined as containing one or more UL BWPs and one or more DL BWPs, and a corresponding BWP set ID may be used for activation, deactivation, or switching all BWPs corresponding to the BWP set ID. In such embodiments, an activation, deactivation, or switching message (e.g., by RRC, MAC CE, or DCI signaling) may indicate the BWP set ID. For example, upon reception of a MAC CE indicating the first BWP 602, a UE may activate, deactivate, or switch the BWPs contained in the first BWP set 602.

As may be appreciated, a many-to-one linking may be used for activation, deactivation, or switching UL and DL BWPs together, or for any other purpose. Moreover, the linking between the DL and UL BWPs may be independent for each purpose. For example, there may be a first linking for activation, a second linking for deactivation, a third linking for switching, a fourth linking for another purpose, or a fifth linking for all purposes.

Figure 7:
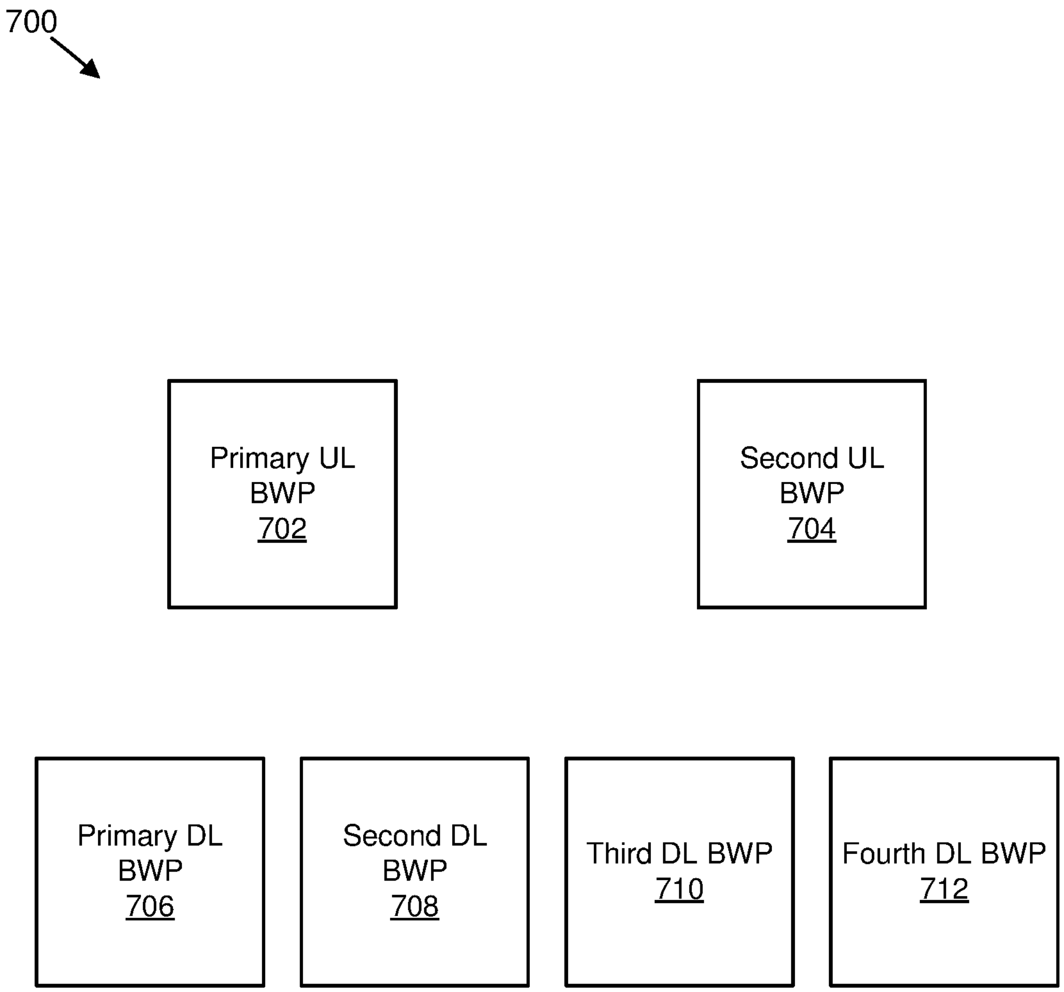
FIG. 7 is a schematic block diagram illustrating one embodiment of a system having a primary BWP.

FIG. 7 is a schematic block diagram illustrating one embodiment of a system 700 having a primary BWP. Specifically, the system 700 includes a primary UL BWP 702, a second UL BWP 704, a primary DL BWP 706, a second DL BWP 708, a third DL BWP 710, and a fourth DL BWP 712. In this embodiment, one or more BWPs (e.g., either an UL BWP, a DL BWP, or one UL BWP and one DL BWP) are designated as primary BWPs.

In some embodiments, the primary BWP may be activated, deactivated, or switched together with the linked BWPs. In certain embodiments, a primary BWP may be considered activated once configured and may not be deactivated until de-configured. In such embodiments, activation or deactivation of linked BWPs may be done independently from the primary BWP (e.g., even though the primary BWP is activated, BWPs linked to the primary BWP may not be activated).

In various embodiments, PUCCH resources on a primary UL BWP may be used to carry HARQ feedback for PDSCH transmission from one or more DL BWP. As may be appreciated, linking between a primary and other BWPs may be a one-to-one linking or a many-to-one linking.

In certain embodiments, a UE receives a RAR only on a primary DL BWP irrespective of which UL BWP was used by the UE to transmit PRACH (e.g., for RA preamble transmission). In some embodiments, only a primary DL BWP is used as a DL pathloss reference for UL power control for PUSCH, PUCCH, RACH etc.

In some embodiments, only a primary DL BWP is to be used for determining if a UE is to use SUL (e.g., supplementary Uplink as defined in TS 38.321 v200) or non-SUL (e.g., normal UL) (e.g., to determine and/or verify if an RSRP of a downlink pathloss reference is less than sul-RSRP-Threshold, etc.).

In various embodiments, non-primary BWPs (e.g., second UL BWP 704, second DL BWP 708, third DL BWP 710, fourth DL BWP 712, etc.) are used to carry other channels like PUSCH and PDSCH scheduled by a network.

Figure 8:
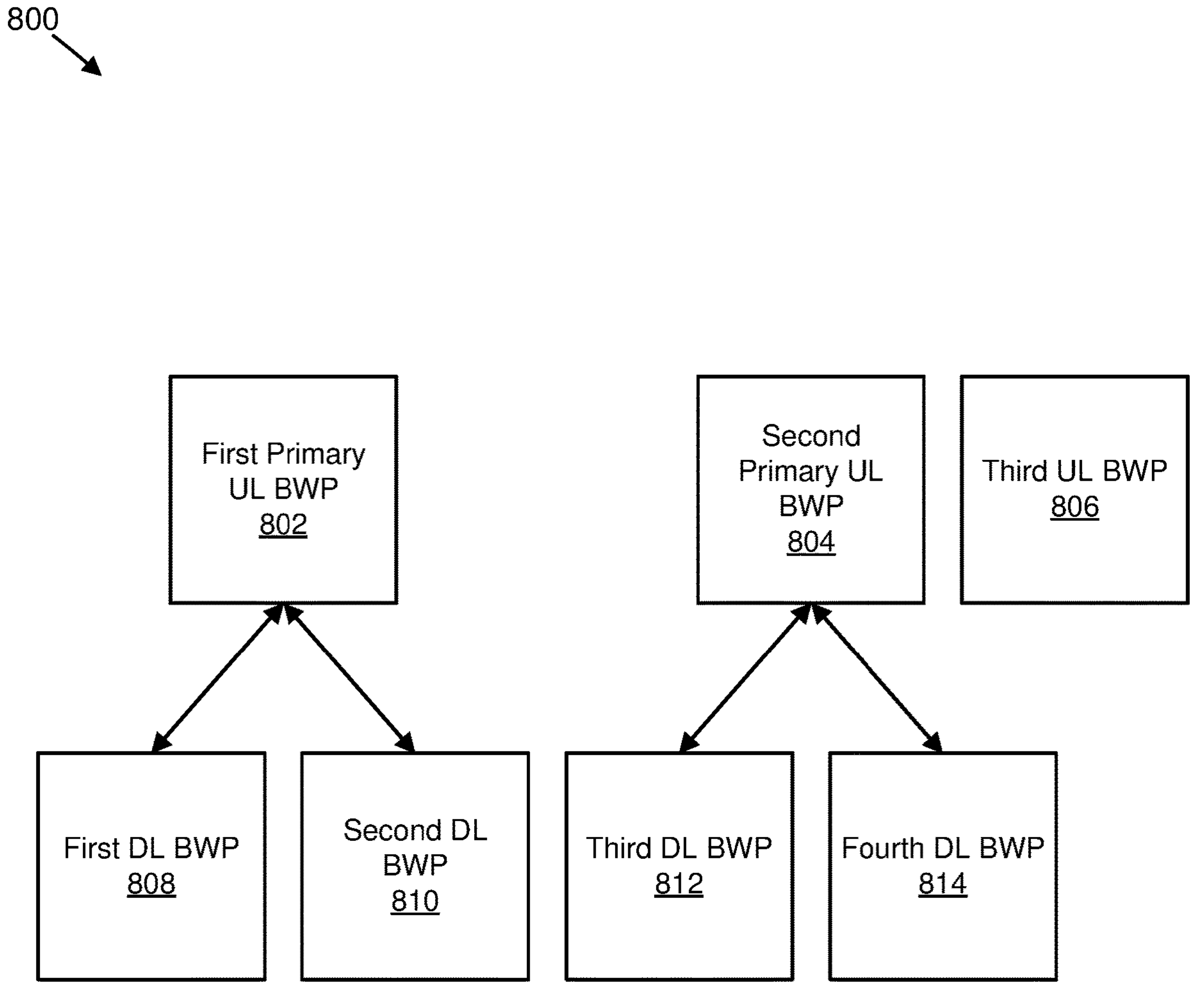
FIG. 8 is a schematic block diagram illustrating another embodiment of a system having a primary BWP.

FIG. 8 is a schematic block diagram illustrating another embodiment of a system 800 having a primary BWP. Specifically, the system 800 includes a first primary UL BWP 802, a second primary UL BWP 804, a third UL BWP 806, a first DL BWP 808, a second DL BWP 810, a third DL BWP 812, and a fourth DL BWP 814. As illustrated, the first primary UL BWP 802 is linked to the first DL BWP 808 and the second DL BWP 810, and the second primary UL BWP 804 is linked to the third DL BWP 812 and the fourth DL BWP 814.

As may be appreciated, a primary BWP may be one or more UL BWPs and/or one or more DL BWPs. In various embodiments, some signaling and/or data (e.g., certain and/ or all RRC messages) may only be transmitted and/or received on the primary BWP.

In one embodiment, a primary BWP is configured by RRC signaling to be any configured BWP, thereby providing flexibility to a network. In another embodiment, a primary BWP is identical to an initial BWP (e.g., a BWP that a UE uses to perform initial access). In such an embodiment, no configuration is necessary (e.g., no configuration overhead is introduced). In certain embodiments, a primary BWP is identical to a default BWP that is configured by RRC signaling. In such embodiments, no configuration is necessary (e.g., no configuration overhead is introduced). In various embodiments, configuration of a primary BWP may be done independently for each purpose (e.g., for PUCCH configuration, receiving RAR, SUL and/or UL determination, or SRS). Therefore, a first BWP and a second BWP may be linked together for one purpose but for the first BWP and a third BWP may be linked for another purpose. Moreover, a primary BWP may be determined and/or used for any suitable purpose.

In some embodiments, if there are multiple active BWPs in one serving cell and multiple serving cells are activated, then a UE may use only some of the PUCCH resources and/or configured grant (e.g., configured uplink grant as described in R2-1801672) opportunities. For example, if two UL BWPs are activated and both are capable of carrying PUCCH transmissions of a UE, either one of the two UL BWPs may be used to carry PUCCH messages. In certain embodiments, various rules may be used by a UE and a gNB to determine which PUCCH and/or configured resources are to be used by the UE. In such embodiments, the gNB may assign unused PUCCH and/or configured grant resources to another UE (e.g., using dynamic grants) or leave them vacant to minimize interference (e.g., intercell interference).

In one embodiment, a rule may include an earliest available resource in time being used. In certain embodiments, if a SR is triggered then a UE may make use of a first opportunity that a logical channel that triggered the SR is allowed to transmit SR on PUCCH resources. Similarly, in some embodiments, for a configured grant configuration, a transmission may be made on a BWP offering a first opportunity on which the transmission of data is allowed according to an LCP restriction as given in 3GPP TS 38.321-200. Accordingly, latency benefits may be enabled because the first available opportunity is used by the UE for transmission of SR or data.

In various embodiments, a rule may include that some resources have a higher priority than other resources. In certain embodiments, higher priority resources may be used if a UE has more than one PUCCH and/or configured grant opportunities and/or resources to choose from. For example, a rule may be used so that the configured grant resource with the lowest PRB index has the highest priority. Here the lowest PRB index is an example and may be derived using a mathematical function by both the UE and the gNB. Accordingly, resource wastage may be reduced because the network may also determine which resources may not be used by the UE and, therefore, the network may allocate (or reallocate) these resources to another UE.

In certain embodiments, a rule may include that resources from a primary cell and/or primary BWP as described herein may be used if the UE has more than one PUCCH and/or configured grant opportunity and/or resource to choose from. Accordingly, resource wastage may be reduced because the network may also determine which resources may not be used by the UE and, therefore, the network may allocate (or reallocate) these resources to another UE.

In various embodiments, a gNB may provide an explicit signal if activating a BWP using a first flag and/or bit that indicates whether configured SR resources on PUCCH may be used by a UE for transmission of SR. In some embodiments, a gNB may provide an explicit signal if activating a BWP using a second flag and/or bit that indicates whether a UE may initialize (or reinitialize) any suspended configured uplink grants of configured grant Type 1 according to a stored configuration. In certain embodiments, the functions of the first and second flags may be achieved using a single flag so that both the SR resources on PUCCH and uplink grants of configured grant Type 1 are together signaled to be activated on a BWP. This may enable a gNB to control which SR resources and/or configured grant configurations a UE is enabled to use if multiple UL BWPs are activated and several of these BWP provide SR resources on PUCCH and/or configured grants. Accordingly, resource wastage may be reduced because the network may also determine which resources may not be used by the UE and, therefore, the network may allocate (or reallocate) these resources to another UE.

In some embodiments, a UE may use SR resources on PUCCH and/or a configured grant on a BWP with the lowest BWP index if multiple BWPs are activated and more than one of these BWPs provide SR resources on PUCCH and/or configured grants. As may be appreciated, the lowest BWP index is just an example and may be replaced by any other index that may be predefined or configured by the network to the UE. Accordingly, resource wastage may be reduced because the network may also determine which resources may not be used by the UE and, therefore, the network may allocate (or reallocate) these resources to another UE.

In various embodiments, a spatial domain transmission filter for SRS transmission may be determined by RRC signaling configuring the spatial domain transmission filter (e.g., a particular DL BWP may be configured). For example, if a UE is configured with a higher layer parameter SRS-SpatialRelationInfo set to “SSB/PBCH,” a gNB may configure SSB and/or PBCH to be used from a particular DL BWP, and the UE may transmit the SRS resource with the same spatial domain transmission filter used for the reception of the SSB and/or PBCH. Moreover, if the UE is configured with the higher layer parameter SRS-SpatialRelationInfo set to “CSI-RS,” the UE may transmit the SRS resource with the same spatial domain transmission filter used for the reception of the periodic CSI-RS or the semi-persistent CSI-RS. Furthermore, if the UE is configured with the higher layer parameter SRS-SpatialRelationInfo set to “SRS,” the UE may transmit the SRS resource with the same spatial domain transmission filter used for the transmission of the periodic SRS. In such embodiments, the UE and the network may have the same understanding of the UE’s behavior.

In certain embodiments, if a UE needs to perform RACH for a SR (e.g., asking for a resource grant to send a BSR, and if more than one BWP has configured PRACH resources, the UE may send a PRACH preamble on a numerology (e.g., corresponding to a BWP) that does not restrict transmission of data from the same logical channel that triggered the SR. In such embodiments, the UE may attempt to receive a RAR on a DL BWP linked to the UL BWP on which the UE transmitted the PRACH preamble. The linking may be performed using any method described herein. The UE may perform the whole RACH procedure on the BWP pair on which it sent the PRACH preamble (e.g., UL BWP) and on which it received the RAR (e.g., DL BWP) (e.g., the RACH Msg3 and Msg4 may be sent on the UL BWP and DL BWP respectively). In various embodiments, a gNB may indicate a different UL BWP (e.g., different than the UL BWP on which a PRACH preamble has been sent by the UE) to be used to transmit Msg3. Using the various embodiments described herein, the UE and the network may both know the UE's behavior and the UE may have a better chance of receiving an UL grant that best serves its data transmission requirements.

In some embodiments, a network sends a RACH order (e.g., PDCCH order or RRC connection reconfiguration carrying RACH resources for handover or for any other purpose) on a certain DL BWP of a serving cell-x and explicitly indicates: an UL BWP that should be used to perform RACH preamble transmission; and/or the serving cell-y to which the UL BWP belongs.

In certain embodiments, if only an UL BWP is indicated in a RACH order, then a UE may assume that the UL BWP (or index corresponding thereto) to be used for RACH belongs to the same cell (e.g., cell-x) on which the RACH order is received. In various embodiments, if only a cell is indicated in a RACH order, then a UE may use the UL BWP that is linked with the DL BWP, wherein the RACH order may be received in one of the ways described herein.

In some embodiments, all RNTIs need not be decoded on every BWP and a UE may be configured with which RNTIs are to be decoded on which BWP. For example, for a first DL BWP the following RNTIs may be decoded: SI-RNTI, P-RNTI, RA-RNTI, for a second DL BWP the following RNTI may be decoded: CS-RNTI (configured grant); and for a third DL BWP the following RNTI may be decoded: C-RNTI. This is just an example and may differ in different configurations. By not having every BWP decode all RNTIs, UE complexity and/or power consumption may be reduced.

Figure 9:
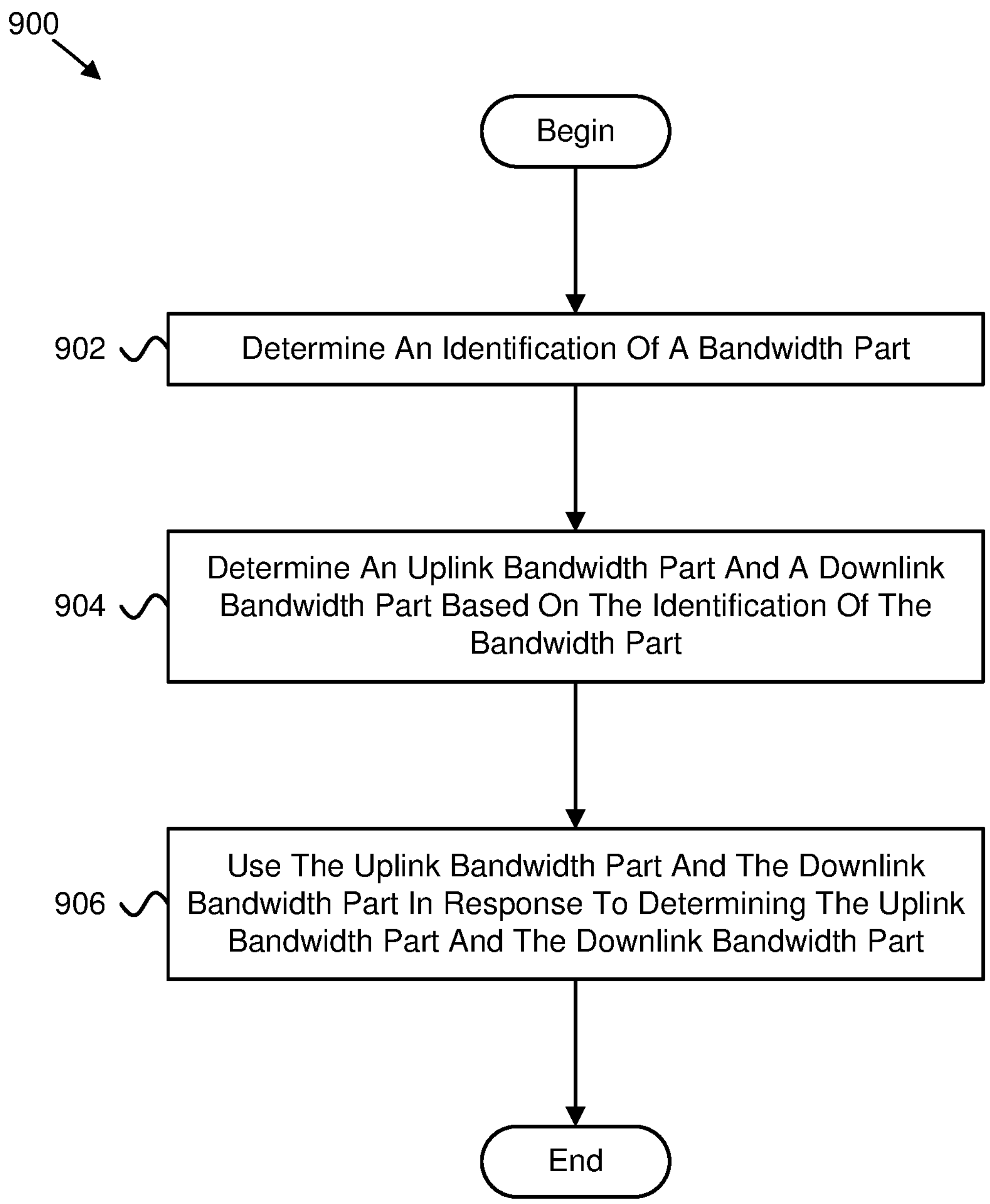
FIG. 9 is a flow chart diagram illustrating one embodiment of a method for determining linked bandwidth parts.

FIG. 9 is a flow chart diagram illustrating one embodiment of a method 900 for determining linked bandwidth parts. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include determining 902 an identification of a bandwidth part. In certain embodiments, the method 900 includes determining 904 an uplink bandwidth part and a downlink bandwidth part based on the identification of the bandwidth part. In various embodiments, the method 900 includes using 906 the uplink bandwidth part and the downlink bandwidth part in response to determining the uplink bandwidth part and the downlink bandwidth part.

In certain embodiments, the method 900 further comprises receiving the identification of the bandwidth part. In some embodiments, the method 900 further comprises receiving information that activates the uplink bandwidth part and the downlink bandwidth part based on the identification of the bandwidth part or deactivates the uplink bandwidth part and the downlink bandwidth part based on the identification of the bandwidth part.

In various embodiments, the uplink bandwidth part is linked to a plurality of downlink bandwidth parts by the identification of the bandwidth part. In one embodiment, the uplink bandwidth part is a primary uplink bandwidth part and the downlink bandwidth part is a primary downlink bandwidth part.

Figure 10:
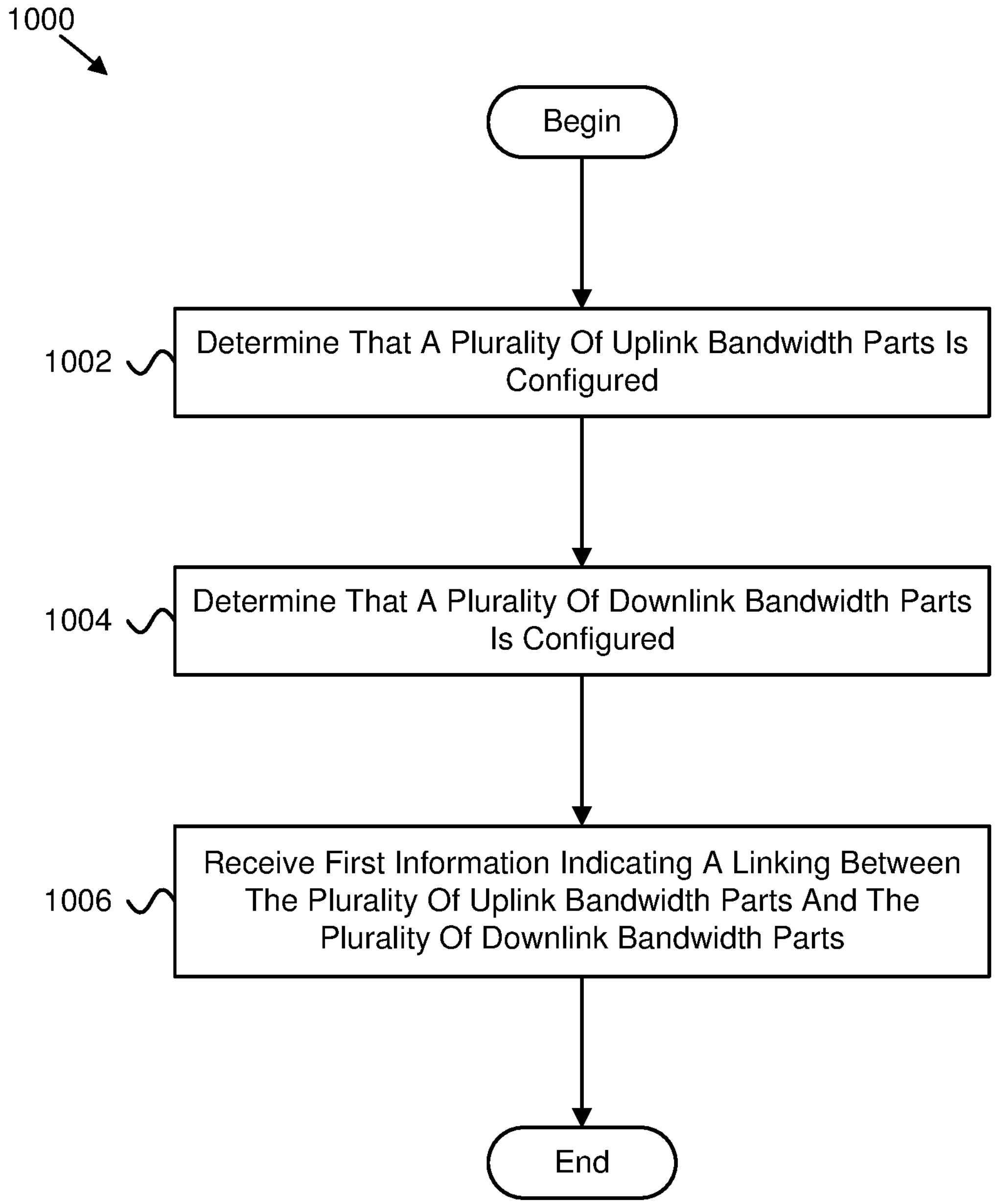
FIG. 10 is a flow chart diagram illustrating another embodiment of a method for determining linked bandwidth parts.

FIG. 10 is a flow chart diagram illustrating another embodiment of a method 1000 for determining linked bandwidth parts. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include determining 1002 that a plurality of uplink bandwidth parts is configured. In certain embodiments, the method 1000 includes determining 1004 that a plurality of downlink bandwidth parts is configured. In various embodiments, the method 1000 includes receiving 1006 first information indicating a linking between the plurality of uplink bandwidth parts and the plurality of downlink bandwidth parts.

In certain embodiments, the linking comprises a link between one uplink bandwidth part of the plurality of uplink bandwidth parts and one downlink bandwidth part of the plurality of downlink bandwidth parts. In some embodiments, the linking comprises a link between each uplink bandwidth part of the plurality of uplink bandwidth parts and a corresponding downlink bandwidth part of the plurality of downlink bandwidth parts. In various embodiments, the first information is received via radio resource control signaling, medium access control signaling, or downlink control information signaling.

In one embodiment, the first information is received at a time that the plurality of uplink bandwidth parts and the plurality of downlink bandwidth parts are configured. In certain embodiments, the method 1000 further comprises receiving second information indicating a change in the linking between the plurality of uplink bandwidth parts and the plurality of downlink bandwidth parts. In some embodiments, the second information is received as part of a bandwidth part reconfiguration.

In various embodiments, a link between an uplink bandwidth part of the plurality of uplink bandwidth parts and a downlink bandwidth part of the plurality of downlink bandwidth parts enables the uplink bandwidth part and the downlink bandwidth part to be controlled together. In one embodiment, controlling the uplink bandwidth part and the downlink bandwidth part together comprises activating the uplink bandwidth part and the downlink bandwidth part together, deactivating the uplink bandwidth part and the downlink bandwidth part together, or switching the uplink bandwidth part and the downlink bandwidth part together if the physical random access channel resources are not available or if switching of only one of the uplink bandwidth part or the downlink bandwidth part by a network.

In certain embodiments, the method 1000 further comprises receiving second information indicating: the uplink bandwidth part, the downlink bandwidth part, or a link index corresponding to the uplink bandwidth part and the downlink bandwidth part; and control information indicating a control for the uplink bandwidth part and the downlink bandwidth part.

In some embodiments, the second information is received via radio resource control signaling, medium access control signaling, or downlink control information signaling. In various embodiments, the linking comprises a link between one uplink bandwidth part of the plurality of uplink bandwidth parts and a set of downlink bandwidth parts of the plurality of downlink bandwidth parts. In one embodiment, the linking comprises a link between one downlink bandwidth part of the plurality of downlink bandwidth parts and a set of uplink bandwidth parts of the plurality of uplink bandwidth parts.

In certain embodiments, the linking comprises a link between at least one primary bandwidth part and at least one bandwidth part. In some embodiments, the at least one primary bandwidth part comprises at least one uplink bandwidth part of the plurality of uplink bandwidth parts or at least one downlink bandwidth part of the plurality of downlink bandwidth parts. In various embodiments, the at least one bandwidth part comprises at least one uplink bandwidth part of the plurality of uplink bandwidth parts or at least one downlink bandwidth part of the plurality of downlink bandwidth parts.

In one embodiment, the at least one primary bandwidth part is activated upon configuration and deactivated upon deconfiguration. In certain embodiments, the at least one bandwidth part is activated independently from the at least one primary bandwidth part. In some embodiments, the at least one primary bandwidth part is used to carry feedback corresponding to the at least one bandwidth part.

In various embodiments, the method 1000 further comprises receiving a random access response on the at least one primary bandwidth part in response to transmitting a random access message using the at least one bandwidth part. In one embodiment, the method 1000 further comprises using the at least one primary bandwidth part for determining pathloss information, determining whether to use a supplementary uplink, or determining whether to use a non-supplementary uplink.

Figure 11:
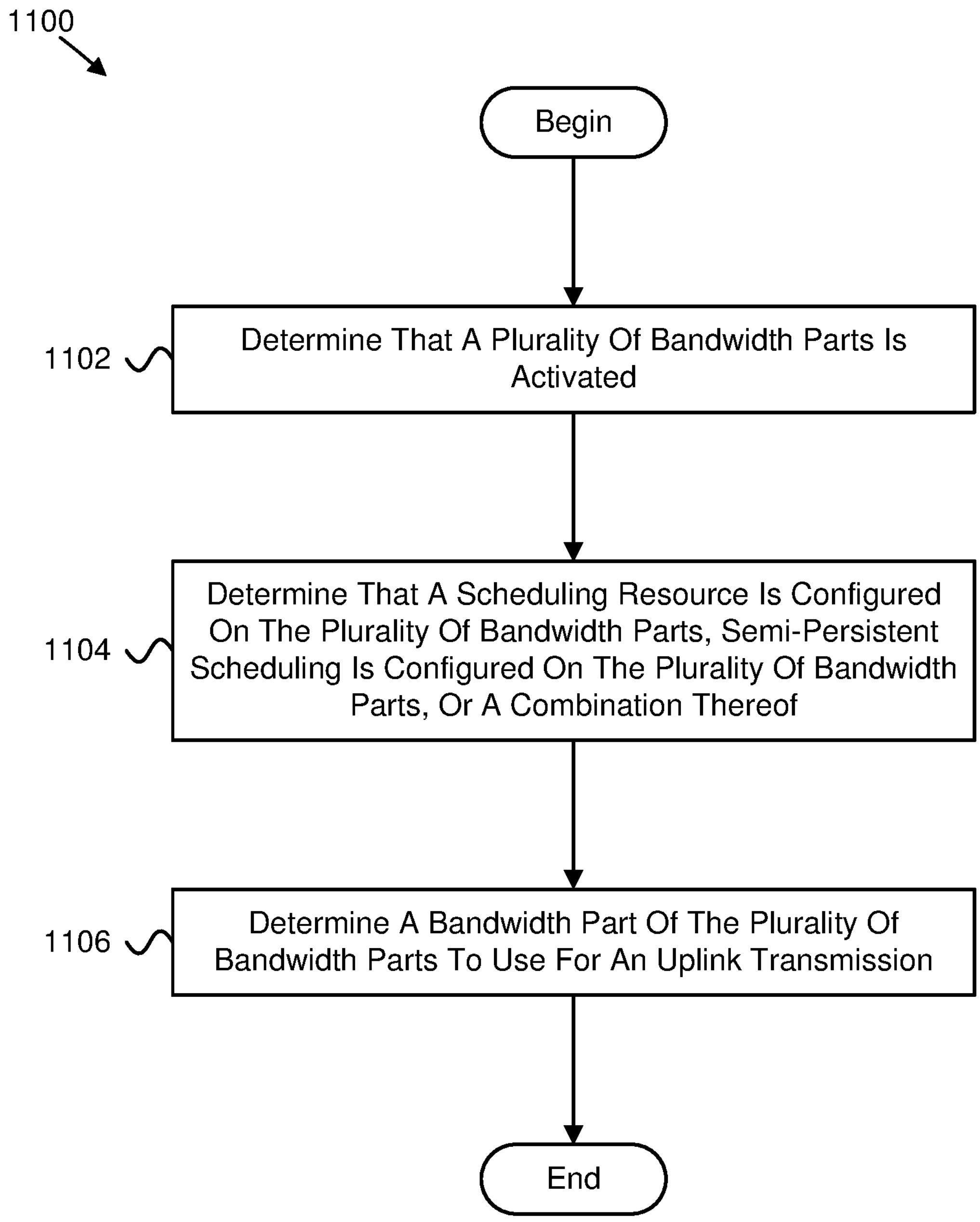
FIG. 11 is a flow chart diagram illustrating a further embodiment of a method for determining linked bandwidth parts.

FIG. 11 is a flow chart diagram illustrating a further embodiment of a method 1100 for determining linked bandwidth parts. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include determining 1102 that a plurality of bandwidth parts is activated. In certain embodiments, the method 1100 includes determining 1104 that a scheduling resource is configured on the plurality of bandwidth parts, semi-persistent scheduling is configured on the plurality of bandwidth parts, or a combination thereof. In various embodiments, the method 1100 includes determining 1106 a bandwidth part of the plurality of bandwidth parts to use for an uplink transmission.

In certain embodiments, determining the bandwidth part to use for the uplink transmission comprises determining the bandwidth part of the plurality of bandwidth parts that is the earliest available in a time domain. In some embodiments, determining the bandwidth part to use for the uplink transmission comprises determining the bandwidth part of the plurality of bandwidth parts that has a highest priority. In various embodiments, determining the bandwidth part to use for the uplink transmission comprises determining the bandwidth part of the plurality of bandwidth parts that is a primary bandwidth part.

In one embodiment, determining the bandwidth part to use for the uplink transmission comprises receiving information indicating the bandwidth part. In certain embodiments, the information indicating the bandwidth part comprises an index value corresponding to the bandwidth part.

Figure 12:
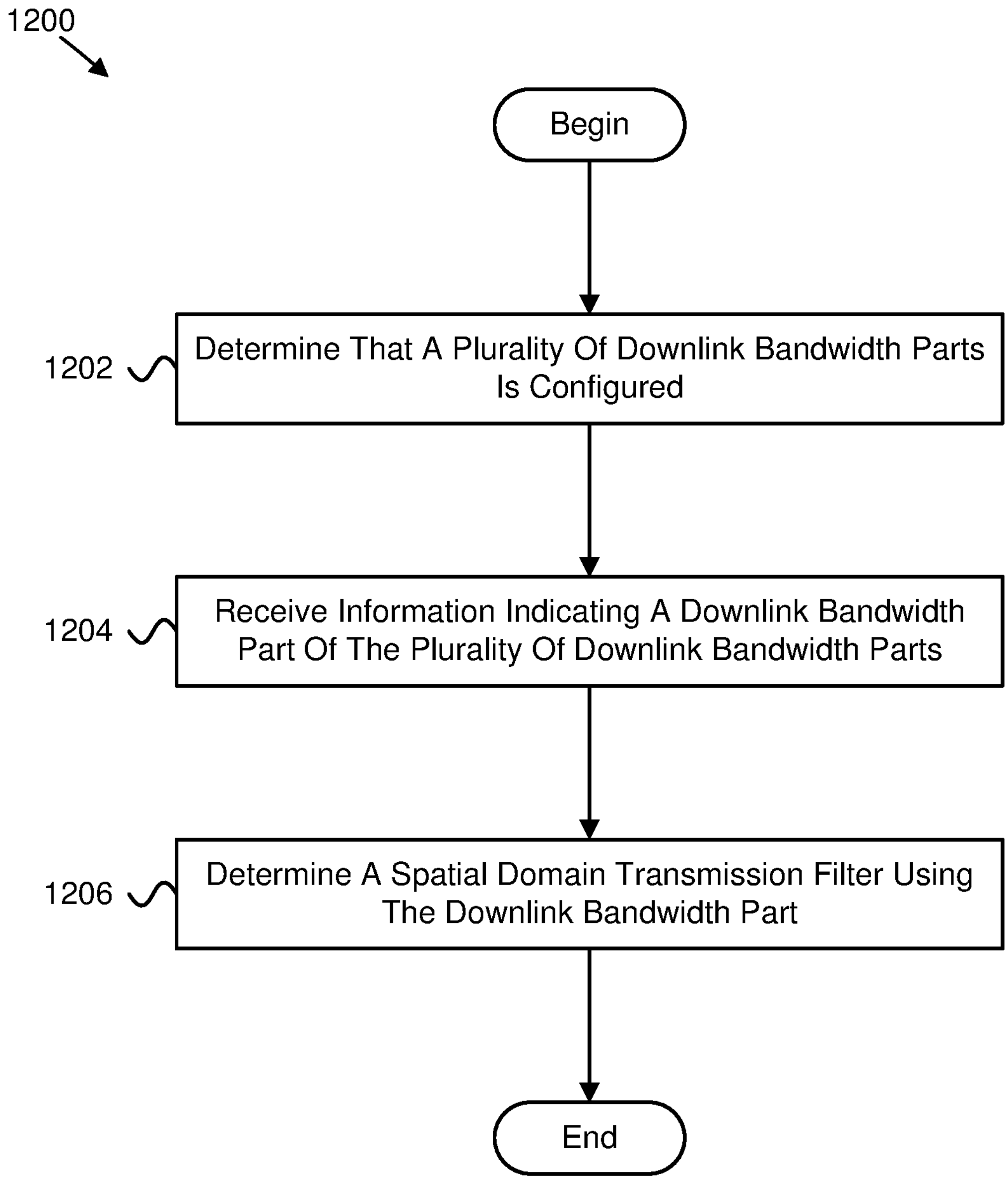
FIG. 12 is a flow chart diagram illustrating yet another embodiment of a method for determining linked bandwidth parts.

FIG. 12 is a flow chart diagram illustrating yet another embodiment of a method 1200 for determining linked bandwidth parts. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

The method 1200 may include determining 1202 that a plurality of downlink bandwidth parts is configured. In certain embodiments, the method 1200 includes receiving 1204 information indicating a downlink bandwidth part of the plurality of downlink bandwidth parts. In various embodiments, the method 1200 includes determining 1206 a spatial domain transmission filter using the downlink bandwidth part.

In certain embodiments, the information is received via radio resource control signaling. In some embodiments, the method 1200 further comprises transmitting a sounding reference signal via a resource using the spatial domain transmission filter.

Figure 13:
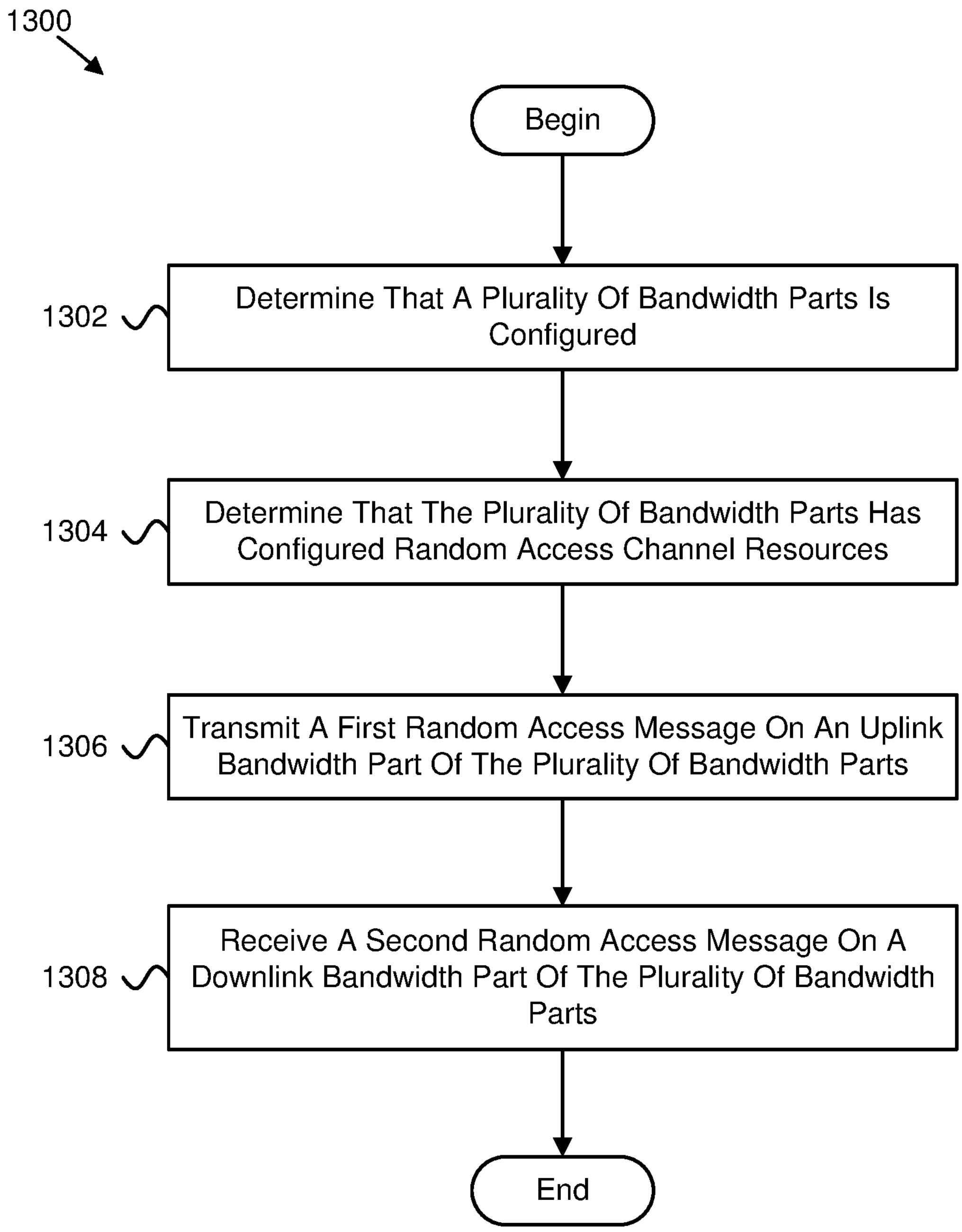
FIG. 13 is a flow chart diagram illustrating yet a further embodiment of a method for determining linked bandwidth parts.

FIG. 13 is a flow chart diagram illustrating yet a further embodiment of a method 1300 for determining linked bandwidth parts. In some embodiments, the method 1300 is performed by an apparatus, such as the remote unit 102. In certain embodiments, the method 1300 may be performed by a processor executing program code, for example, a microcontroller, a microprocessor, a CPU, a GPU, an auxiliary processing unit, a FPGA, or the like.

The method 1300 may include determining 1302 that a plurality of bandwidth parts is configured. In certain embodiments, the method 1300 includes determining 1304 that the plurality of bandwidth parts has configured random access channel resources. In various embodiments, the method 1300 includes transmitting 1306 a first random access message on an uplink bandwidth part of the plurality of bandwidth parts. In some embodiments, the method 1300 includes receiving 1308 a second random access message on a downlink bandwidth part of the plurality of bandwidth parts.

In certain embodiments, the uplink bandwidth part is linked to the downlink bandwidth part. In some embodiments, the method 1300 further comprises receiving information indicating the downlink bandwidth part. In various embodiments, the method 1300 further comprises receiving information indicating the uplink bandwidth part. In one embodiment, the method 1300 further comprises receiving information indicating a serving cell corresponding to the uplink bandwidth part.

In one embodiment, a method comprises: determining an identification of a bandwidth part; determining an uplink bandwidth part and a downlink bandwidth part based on the identification of the bandwidth part; and using the uplink bandwidth part and the downlink bandwidth part in response to determining the uplink bandwidth part and the downlink bandwidth part.

In certain embodiments, the method further comprises receiving the identification of the bandwidth part.

In some embodiments, the method further comprises receiving information that activates the uplink bandwidth part and the downlink bandwidth part based on the identification of the bandwidth part or deactivates the uplink bandwidth part and the downlink bandwidth part based on the identification of the bandwidth part.

In various embodiments, the uplink bandwidth part is linked to a plurality of downlink bandwidth parts by the identification of the bandwidth part.

In one embodiment, the uplink bandwidth part is a primary uplink bandwidth part and the downlink bandwidth part is a primary downlink bandwidth part.

In one embodiment, an apparatus comprises: a processor that: determines an identification of a bandwidth part; determines an uplink bandwidth part and a downlink bandwidth part based on the identification of the bandwidth part; and uses the uplink bandwidth part and the downlink bandwidth part in response to determining the uplink bandwidth part and the downlink bandwidth part.

In certain embodiments, the apparatus further comprises a receiver that receives the identification of the bandwidth part.

In some embodiments, the receiver receives information that activates the uplink bandwidth part and the downlink bandwidth part based on the identification of the bandwidth part or deactivates the uplink bandwidth part and the downlink bandwidth part based on the identification of the bandwidth part.

In various embodiments, the uplink bandwidth part is linked to a plurality of downlink bandwidth parts by the identification of the bandwidth part.

In one embodiment, the uplink bandwidth part is a primary uplink bandwidth part and the downlink bandwidth part is a primary downlink bandwidth part.

In one embodiment, a method comprises: determining that a plurality of uplink bandwidth parts is configured; determining that a plurality of downlink bandwidth parts is configured; and receiving first information indicating a linking between the plurality of uplink bandwidth parts and the plurality of downlink bandwidth parts.

In certain embodiments, the linking comprises a link between one uplink bandwidth part of the plurality of uplink bandwidth parts and one downlink bandwidth part of the plurality of downlink bandwidth parts.

In some embodiments, the linking comprises a link between each uplink bandwidth part of the plurality of uplink bandwidth parts and a corresponding downlink bandwidth part of the plurality of downlink bandwidth parts.

In various embodiments, the first information is received via radio resource control signaling, medium access control signaling, or downlink control information signaling.

In one embodiment, the first information is received at a time that the plurality of uplink bandwidth parts and the plurality of downlink bandwidth parts are configured.

In certain embodiments, the method further comprises receiving second information indicating a change in the linking between the plurality of uplink bandwidth parts and the plurality of downlink bandwidth parts.

In some embodiments, the second information is received as part of a bandwidth part reconfiguration.

In various embodiments, a link between an uplink bandwidth part of the plurality of uplink bandwidth parts and a downlink bandwidth part of the plurality of downlink bandwidth parts enables the uplink bandwidth part and the downlink bandwidth part to be controlled together.

In one embodiment, controlling the uplink bandwidth part and the downlink bandwidth part together comprises activating the uplink bandwidth part and the downlink bandwidth part together, deactivating the uplink bandwidth part and the downlink bandwidth part together, or switching the uplink bandwidth part and the downlink bandwidth part together if the physical random access channel resources are not available or if switching of only one of the uplink bandwidth part or the downlink bandwidth part by a network.

In certain embodiments, the method further comprises receiving second information indicating: the uplink bandwidth part, the downlink bandwidth part, or a link index corresponding to the uplink bandwidth part and the downlink bandwidth part; and control information indicating a control for the uplink bandwidth part and the downlink bandwidth part.

In some embodiments, the second information is received via radio resource control signaling, medium access control signaling, or downlink control information signaling.

In various embodiments, the linking comprises a link between one uplink bandwidth part of the plurality of uplink bandwidth parts and a set of downlink bandwidth parts of the plurality of downlink bandwidth parts.

In one embodiment, the linking comprises a link between one downlink bandwidth part of the plurality of downlink bandwidth parts and a set of uplink bandwidth parts of the plurality of uplink bandwidth parts.

In certain embodiments, the linking comprises a link between at least one primary bandwidth part and at least one bandwidth part.

In some embodiments, the at least one primary bandwidth part comprises at least one uplink bandwidth part of the plurality of uplink bandwidth parts or at least one downlink bandwidth part of the plurality of downlink bandwidth parts.

In various embodiments, the at least one bandwidth part comprises at least one uplink bandwidth part of the plurality of uplink bandwidth parts or at least one downlink bandwidth part of the plurality of downlink bandwidth parts.

In one embodiment, the at least one primary bandwidth part is activated upon configuration and deactivated upon deconfiguration.

In certain embodiments, the at least one bandwidth part is activated independently from the at least one primary bandwidth part.

In some embodiments, the at least one primary bandwidth part is used to carry feedback corresponding to the at least one bandwidth part.

In various embodiments, the method further comprises receiving a random access response on the at least one primary bandwidth part in response to transmitting a random access message using the at least one bandwidth part.

In one embodiment, the method further comprises using the at least one primary bandwidth part for determining pathloss information, determining whether to use a supplementary uplink, or determining whether to use a non-supplementary uplink.

In one embodiment, an apparatus comprises: a processor that: determines that a plurality of uplink bandwidth parts is configured; and determines that a plurality of downlink bandwidth parts is configured; and a receiver that receives first information indicating a linking between the plurality of uplink bandwidth parts and the plurality of downlink bandwidth parts.

In certain embodiments, the linking comprises a link between one uplink bandwidth part of the plurality of uplink bandwidth parts and one downlink bandwidth part of the plurality of downlink bandwidth parts.

In some embodiments, the linking comprises a link between each uplink bandwidth part of the plurality of uplink bandwidth parts and a corresponding downlink bandwidth part of the plurality of downlink bandwidth parts.

In various embodiments, the first information is received via radio resource control signaling, medium access control signaling, or downlink control information signaling.

In one embodiment, the first information is received at a time that the plurality of uplink bandwidth parts and the plurality of downlink bandwidth parts are configured.

In certain embodiments, the receiver receives second information indicating a change in the linking between the plurality of uplink bandwidth parts and the plurality of downlink bandwidth parts.

In some embodiments, the second information is received as part of a bandwidth part reconfiguration.

In various embodiments, a link between an uplink bandwidth part of the plurality of uplink bandwidth parts and a downlink bandwidth part of the plurality of downlink bandwidth parts enables the uplink bandwidth part and the downlink bandwidth part to be controlled together.

In one embodiment, controlling the uplink bandwidth part and the downlink bandwidth part together comprises activating the uplink bandwidth part and the downlink bandwidth part together, deactivating the uplink bandwidth part and the downlink bandwidth part together, or switching the uplink bandwidth part and the downlink bandwidth part together if the physical random access channel resources are not available or if switching of only one of the uplink bandwidth part or the downlink bandwidth part by a network.

In certain embodiments, the receiver receives second information indicating: the uplink bandwidth part, the downlink bandwidth part, or a link index corresponding to the uplink bandwidth part and the downlink bandwidth part; and control information indicating a control for the uplink bandwidth part and the downlink bandwidth part.

In some embodiments, the second information is received via radio resource control signaling, medium access control signaling, or downlink control information signaling.

In various embodiments, the linking comprises a link between one uplink bandwidth part of the plurality of uplink bandwidth parts and a set of downlink bandwidth parts of the plurality of downlink bandwidth parts.

In one embodiment, the linking comprises a link between one downlink bandwidth part of the plurality of downlink bandwidth parts and a set of uplink bandwidth parts of the plurality of uplink bandwidth parts.

In certain embodiments, the linking comprises a link between at least one primary bandwidth part and at least one bandwidth part.

In some embodiments, the at least one primary bandwidth part comprises at least one uplink bandwidth part of the plurality of uplink bandwidth parts or at least one downlink bandwidth part of the plurality of downlink bandwidth parts.

In various embodiments, the at least one bandwidth part comprises at least one uplink bandwidth part of the plurality of uplink bandwidth parts or at least one downlink bandwidth part of the plurality of downlink bandwidth parts.

In one embodiment, the at least one primary bandwidth part is activated upon configuration and deactivated upon deconfiguration.

In certain embodiments, the at least one bandwidth part is activated independently from the at least one primary bandwidth part.

In some embodiments, the at least one primary bandwidth part is used to carry feedback corresponding to the at least one bandwidth part.

In various embodiments, the receiver receives a random access response on the at least one primary bandwidth part in response to transmitting a random access message using the at least one bandwidth part.

In one embodiment, the processor uses the at least one primary bandwidth part for determining pathloss information, determining whether to use a supplementary uplink, or determining whether to use a non-supplementary uplink.

In one embodiment, a method comprises: determining that a plurality of bandwidth parts is activated; determining that a scheduling resource is configured on the plurality of bandwidth parts, semi-persistent scheduling is configured on the plurality of bandwidth parts, or a combination thereof; and determining a bandwidth part of the plurality of bandwidth parts to use for an uplink transmission.

In certain embodiments, determining the bandwidth part to use for the uplink transmission comprises determining the bandwidth part of the plurality of bandwidth parts that is the earliest available in a time domain.

In some embodiments, determining the bandwidth part to use for the uplink transmission comprises determining the bandwidth part of the plurality of bandwidth parts that has a highest priority.

In various embodiments, determining the bandwidth part to use for the uplink transmission comprises determining the bandwidth part of the plurality of bandwidth parts that is a primary bandwidth part.

In one embodiment, determining the bandwidth part to use for the uplink transmission comprises receiving information indicating the bandwidth part.

In certain embodiments, the information indicating the bandwidth part comprises an index value corresponding to the bandwidth part.

In one embodiment, an apparatus comprises: a processor that: determines that a plurality of bandwidth parts is activated; determines that a scheduling resource is configured on the plurality of bandwidth parts, semi-persistent scheduling is configured on the plurality of bandwidth parts, or a combination thereof; and determines a bandwidth part of the plurality of bandwidth parts to use for an uplink transmission.

In certain embodiments, the processor determines the bandwidth part to use for the uplink transmission by determining the bandwidth part of the plurality of bandwidth parts that is the earliest available in a time domain.

In some embodiments, the processor determines the bandwidth part to use for the uplink transmission by determining the bandwidth part of the plurality of bandwidth parts that has a highest priority.

In various embodiments, the processor determines the bandwidth part to use for the uplink transmission by determining the bandwidth part of the plurality of bandwidth parts that is a primary bandwidth part.

In one embodiment, the apparatus further comprises a receiver, wherein the processor determining the bandwidth part to use for the uplink transmission comprises the receiver receiving information indicating the bandwidth part.

In certain embodiments, the information indicating the bandwidth part comprises an index value corresponding to the bandwidth part.

In one embodiment, a method comprises: determining that a plurality of downlink bandwidth parts is configured; receiving information indicating a downlink bandwidth part of the plurality of downlink bandwidth parts; and determining a spatial domain transmission filter using the downlink bandwidth part.

In certain embodiments, the information is received via radio resource control signaling.

In some embodiments, the method further comprises transmitting a sounding reference signal via a resource using the spatial domain transmission filter.

In one embodiment, an apparatus comprises: a processor that determines that a plurality of downlink bandwidth parts is configured; and a receiver that receives information indicating a downlink bandwidth part of the plurality of downlink bandwidth parts; wherein the processor determines a spatial domain transmission filter using the downlink bandwidth part.

In certain embodiments, the information is received via radio resource control signaling.

In some embodiments, the apparatus further comprises a transmitter that transmits a sounding reference signal via a resource using the spatial domain transmission filter.

In one embodiment, a method comprises: determining that a plurality of bandwidth parts is configured; determining that the plurality of bandwidth parts has configured random access channel resources; transmitting a first random access message on an uplink bandwidth part of the plurality of bandwidth parts; and receiving a second random access message on a downlink bandwidth part of the plurality of bandwidth parts.

In certain embodiments, the uplink bandwidth part is linked to the downlink bandwidth part.

In some embodiments, the method further comprises receiving information indicating the downlink bandwidth part.

In various embodiments, the method further comprises receiving information indicating the uplink bandwidth part.

In one embodiment, the method further comprises receiving information indicating a serving cell corresponding to the uplink bandwidth part.

In one embodiment, an apparatus comprises: a processor that: determines that a plurality of bandwidth parts is configured; and determines that the plurality of bandwidth parts has configured random access channel resources; a transmitter that transmits a first random access message on an uplink bandwidth part of the plurality of bandwidth parts; and a receiver that receives a second random access message on a downlink bandwidth part of the plurality of bandwidth parts.

In certain embodiments, the uplink bandwidth part is linked to the downlink bandwidth part.

In some embodiments, the receiver receives information indicating the downlink bandwidth part.

In various embodiments, the receiver receives information indicating the uplink bandwidth part.

In one embodiment, the receiver receives information indicating a serving cell corresponding to the uplink bandwidth part.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:

at least one memory; and at least one processor coupled with the at least one memory and configured to cause the UE to:

receive radio resource control (RRC) signaling indicating a set of bandwidth parts (BWPs) using a single identifier that identifies a linked pair comprising a first BWP and a second BWP, wherein the first BWP and the second BWP are pre-associated as a pair for a random access procedure, and wherein the RRC signaling indicates a serving cell configuration that configures up to four BWPs;

transmit a random access message of the random access procedure on the first BWP; and receive a random access response message of the random access procedure on the second BWP, wherein the second BWP is different than the first BWP, wherein the second BWP for receiving the random access response message is indicated as the BWP for the random access response message in the RRC signaling prior to transmitting the random access message, and wherein the second BWP is determined based on the single identifier without additional signaling after transmission of the random access message.

2. The UE of claim 1, wherein the first BWP comprises an uplink BWP, and wherein the second BWP comprises a downlink BWP.

3. The UE of claim 2, wherein the uplink BWP or the downlink BWP, or both, are associated with a serving cell.

4. The UE of claim 1, wherein, to receive the RRC signaling, the at least one processor is configured to cause the UE to:

receive a radio resource control (RRC) message indicating the set of BWPs.

5. The UE of claim 1, wherein, to receive the RRC signaling, the at least one processor is configured to cause the UE to:

receive a medium access control-control element (MAC-CE) indicating the set of BWPs.

6. The UE of claim 1, wherein, to receive the RRC signaling, the at least one processor is configured to cause the UE to:

receive a downlink control information (DCI) indicating the set of BWPs.

7. A method at a user equipment (UE), the method comprising:

receiving radio resource control (RRC) signaling indicating a set of bandwidth parts (BWPs) using a single identifier that identifies a linked pair comprising a first BWP and a second BWP, wherein the first BWP and the second BWP are pre-associated as a pair for a random access procedure, and wherein the RRC signaling indicates a serving cell configuration that configures up to four BWPs;

transmitting a random access message of the random access procedure on the first BWP; and receiving a random access response message of the random access procedure on the second BWP, wherein the second BWP is different than the first BWP, wherein the second BWP for receiving the random access response message is indicated as the BWP for the random access response message in the RRC signaling prior to transmitting the random access message, and wherein the second BWP is determined based on the single identifier without additional signaling after transmission of the random access message.

8. The method of claim 7, wherein the first BWP comprises an uplink BWP, and wherein the second BWP comprises a downlink BWP.

9. The method of claim 8, wherein the uplink BWP or the downlink BWP, or both, are associated with a serving cell.

10. The method of claim 7, wherein receiving the RRC signaling comprises:

receiving a radio resource control (RRC) message indicating the set of BWPs.

11. The method of claim 7, wherein receiving the RRC signaling comprises:

receiving a medium access control-control element (MAC-CE) indicating the set of BWPs.

12. The method of claim 7, wherein receiving the RRC signaling comprises:

receiving a downlink control information (DCI) indicating the set of BWPs.

13. A processor for wireless communication, comprising:

at least one controller coupled with at least one memory and configured to cause the processor to:

receive radio resource control (RRC) signaling indicating a set of bandwidth parts (BWPs) using a single identifier that identifies a linked pair comprising a first BWP and a second BWP, wherein the first BWP and the second BWP are pre-associated as a pair for a random access procedure, and wherein the RRC signaling indicates a serving cell configuration that configures up to four BWPs;

transmit a random access message of the random access procedure on the first BWP; and receive a random access response message of the random access procedure on the second BWP, wherein the second BWP is different than the first BWP, wherein the second BWP for receiving the random access response message is indicated as the BWP for the random access response message in the RRC signaling prior to transmitting the random access message, and wherein the second BWP is determined based on the single identifier without additional signaling after transmission of the random access message.

14. The processor of claim 13, wherein the first BWP comprises an uplink BWP, and wherein the second BWP comprises a downlink BWP.

15. The processor of claim 14, wherein the uplink BWP or the downlink BWP, or both, are associated with a serving cell.

16. The processor of claim 13, wherein, to receive the RRC signaling, the at least one controller is configured to cause the processor to:

receive a radio resource control (RRC) message indicating the set of BWPs.

17. The processor of claim 13, wherein, to receive the RRC signaling, the at least one controller is configured to cause the processor to:

receive a medium access control-control element (MAC-CE) indicating the set of BWPs.

18. The processor of claim 13, wherein, to receive the RRC signaling, the at least one controller is configured to cause the processor to:

receive a downlink control information (DCI) indicating the set of BWPs.

* * * * *